US012713131B2

(12) United States Patent
Tsukiji

(10) Patent No.: US 12,713,131 B2
(45) Date of Patent: Aug. 18, 2026

(54) CONTROL METHOD, CONTROL APPARATUS, IMAGE CAPTURING APPARATUS, AND COMPUTER READABLE STORAGE MEDIUM

(71) Applicant: Asahi Kasei Microdevices Corporation, Tokyo (JP)

(72) Inventor: Hidekazu Tsukiji, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 240 days.

(21) Appl. No.: 18/603,219

(22) Filed: Mar. 13, 2024

(65) Prior Publication Data

US 2024/0319516 A1 Sep. 26, 2024

(30) Foreign Application Priority Data

Mar. 17, 2023 (JP) ................................ 2023-043588

(51) Int. Cl.
*H04N 23/68* (2023.01)
*G02B 27/64* (2006.01)
*G03B 5/00* (2021.01)

(52) U.S. Cl.
CPC ......... *H04N 23/687* (2023.01); *G02B 27/646* (2013.01); *G03B 5/00* (2013.01); *H04N 23/6812* (2023.01); *G03B 2205/0007* (2013.01); *G03B 2205/0046* (2013.01); *G03B 2205/0069* (2013.01)

(58) Field of Classification Search
None
See application file for complete search history.

(56) References Cited

U.S. PATENT DOCUMENTS

| | | | |
|---|---|---|---|
| 2012/0014681 A1 | 1/2012 | Miyahara | |
| 2015/0198783 A1 | 7/2015 | Shimotsu | |
| 2015/0350507 A1 | 12/2015 | Topliss | |

(Continued)

FOREIGN PATENT DOCUMENTS

| | | | |
|---|---|---|---|
| EP | 2182621 | A1 | 5/2010 |
| JP | 2001030136 | A | 2/2001 |
| JP | 3486499 | B2 | 1/2004 |

(Continued)

*Primary Examiner* — Paul M Berardesca

(57) ABSTRACT

Provided is a program for causing a computer to function as a control apparatus which controls m+n control circuits. The program causes the computer to perform: acquiring position information from m+n position sensors, acquiring a target posture information with degrees of freedom components associated with a movement or a rotation of a movable member, deriving correction information indicating a corrective component for correcting misalignments of target positions of the movable member due to at least one of n degrees of freedom components based on at least one value of m+n values indicated in the position information, deriving m+n target positions of the movable member based on m degrees of freedom components indicated in the target posture information, the corrective component indicated in the correction information, and a set of coefficients, and outputting target position information indicating the target positions of the movable member to the m+n control circuits.

20 Claims, 22 Drawing Sheets

(56) References Cited

U.S. PATENT DOCUMENTS

| | | | | |
|---|---|---|---|---|
| 2018/0343393 | A1* | 11/2018 | Maede ..................... | G03B 5/04 |
| 2018/0376068 | A1 | 12/2018 | Shimatani | |

FOREIGN PATENT DOCUMENTS

| | | | |
|---|---|---|---|
| JP | 2015227945 | A | 12/2015 |
| JP | 2017184600 | A | 10/2017 |
| JP | 2019028340 | A | 2/2019 |
| JP | 2019045699 | A | 3/2019 |
| JP | 2021126040 | A | 8/2021 |
| JP | 2022025311 | A | 2/2022 |

* cited by examiner

100

220
S
N
N
S
MOVEMENT DIRECTION
MOVEMENT DIRECTION
DRIVE RANGE A
DRIVE RANGE B
DRIVE RANGE C
DRIVE RANGE D
INTEGRATED CIRCUIT A
140A
INTEGRATED CIRCUIT B
140B
INTEGRATED CIRCUIT C
140C
INTEGRATED CIRCUIT D
140D
OVERLAPPING RANGE α
OVERLAPPING RANGE β
OVERLAPPING RANGE γ
OVERLAPPING RANGE δ
OVERLAPPING RANGE ε

CONTROL METHOD, CONTROL APPARATUS, IMAGE CAPTURING APPARATUS, AND COMPUTER READABLE STORAGE MEDIUM

The contents of the following patent application(s) are incorporated herein by reference:

No. 2023-043588 filed in JP on Mar. 17, 2023.

BACKGROUND

1. Technical Field

The present invention relates to a control method, a control apparatus, an image capturing apparatus, and a computer readable storage medium.

2. Related Art

Patent document 1 describes that a current error signal from a differentiator of each coil is selectively switched and output to other coils as a current command, thereby compensating for a decrease in thrust upon coil switching.

PRIOR ART DOCUMENT

Patent Document

Patent Document 1: Japanese patent No. 3486499

DESCRIPTION OF EXEMPLARY EMBODIMENTS

Hereinafter, embodiments of the present invention will be described through embodiments of the invention. However, the following embodiments are not for limiting the invention according to the claims. In addition, not all of the combinations of features described in the embodiments are essential to the solving means of the invention.

Figure 1:
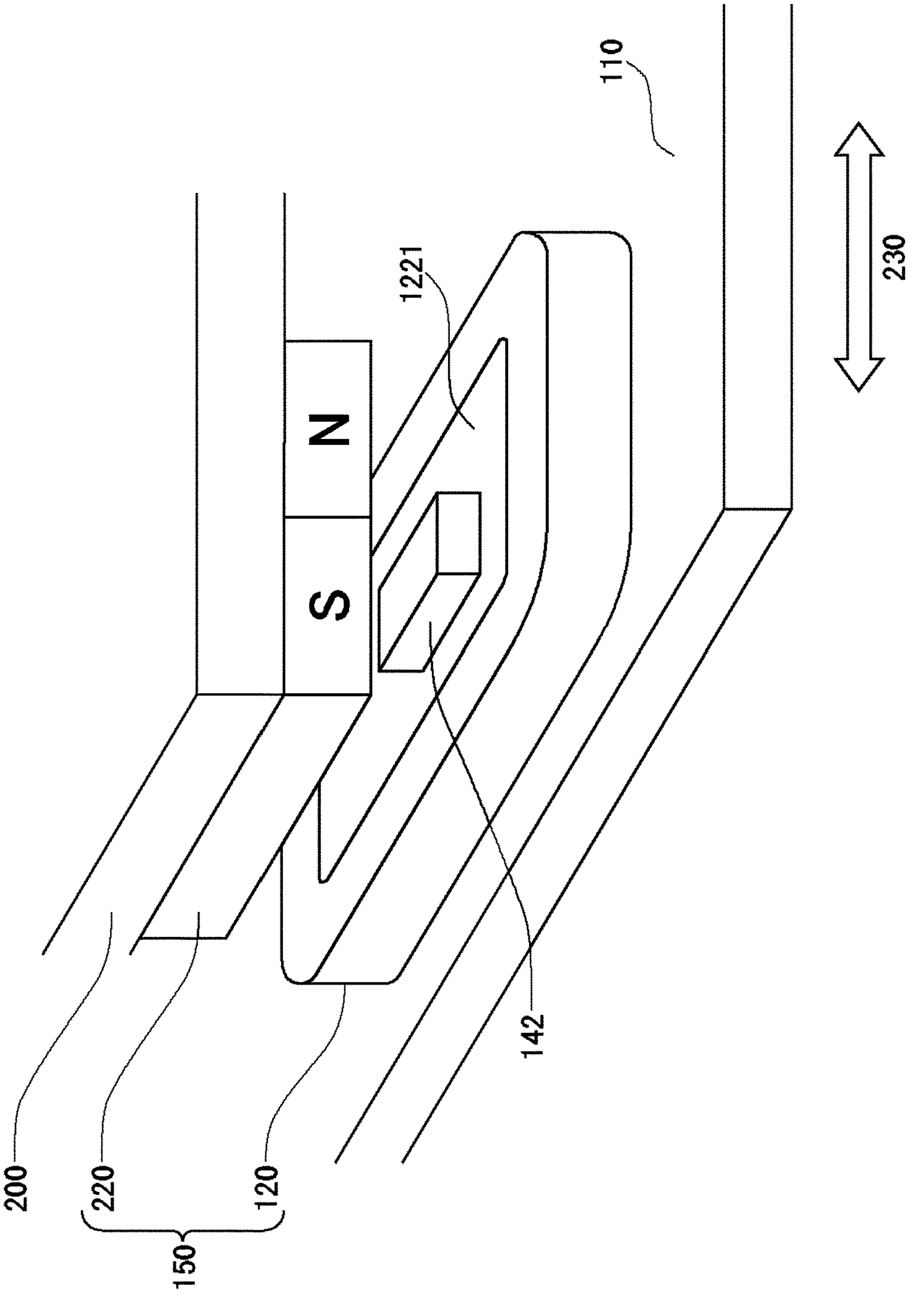
FIG. 1 shows how an electromagnetic actuator 150 is driven.

FIG. 1 shows how an electromagnetic actuator 150 which is used to drive a lens or an image capturing element or the like provided in an image capturing apparatus or the like is driven. The electromagnetic actuator 150 translates a movable member 110 by electromagnetic force along an arrow direction 230.

The movable member 110 is provided with an air-core coil 120 on a surface opposing a substrate 200. On the other hand, the substrate 200 is provided with a magnet 220 on a surface opposing the movable member 110. Note that the present embodiment describes a form in which the air-core coil 120 is arranged above the movable member 110. However, the magnet 220 may be arranged above the movable member 110, and the air-core coil 120 may be provided on the substrate 200.

For example, the electromagnetic actuator 150 moves the movable member 110 provided on the image capturing apparatus for the substrate 200 at the opposing side. The electromagnetic actuator 150 includes the air-core coil 120 and the magnet 220. The lens or the like is arranged on the movable member 110. That is, the lens or the like is movable together with the movable member 110. With the lens or the like moving, an image shake correcting function of the lens in the image capturing apparatus, a zoom function of a camera, a lens control function in a VR head-mounted display, or the like can be implemented. Here, the electromagnetic actuator 150 corresponds to a "driving source."

If current is supplied to the air-core coil 120 in a magnetic field of the magnet 220, a force is generated in the air-core coil 120 in a direction perpendicular to the magnetic field. In this manner, a thrust along the arrow direction 230 is given to the movable member 110.

A position sensor 142, implemented together with an integrated circuit 140 which is described below, is arranged within an air-core portion 1221 of the air-core coil 120 above the movable member 110. The position sensor 142 may be a magnetic sensor such as a Hall element. In this case, the position sensor 142 outputs a signal, a magnitude of which is according to a variation in the magnetic field. With the movement of the movable member 110, a positional relation between the position sensor 142 and the magnet 220 is varied, and a magnitude of the magnetic field detected by the position sensor 142 is varied. In this manner, the position sensor 142 detects a position of the position sensor 142 for the magnet 220, i.e., a position of the movable member 110.

Figure 2:
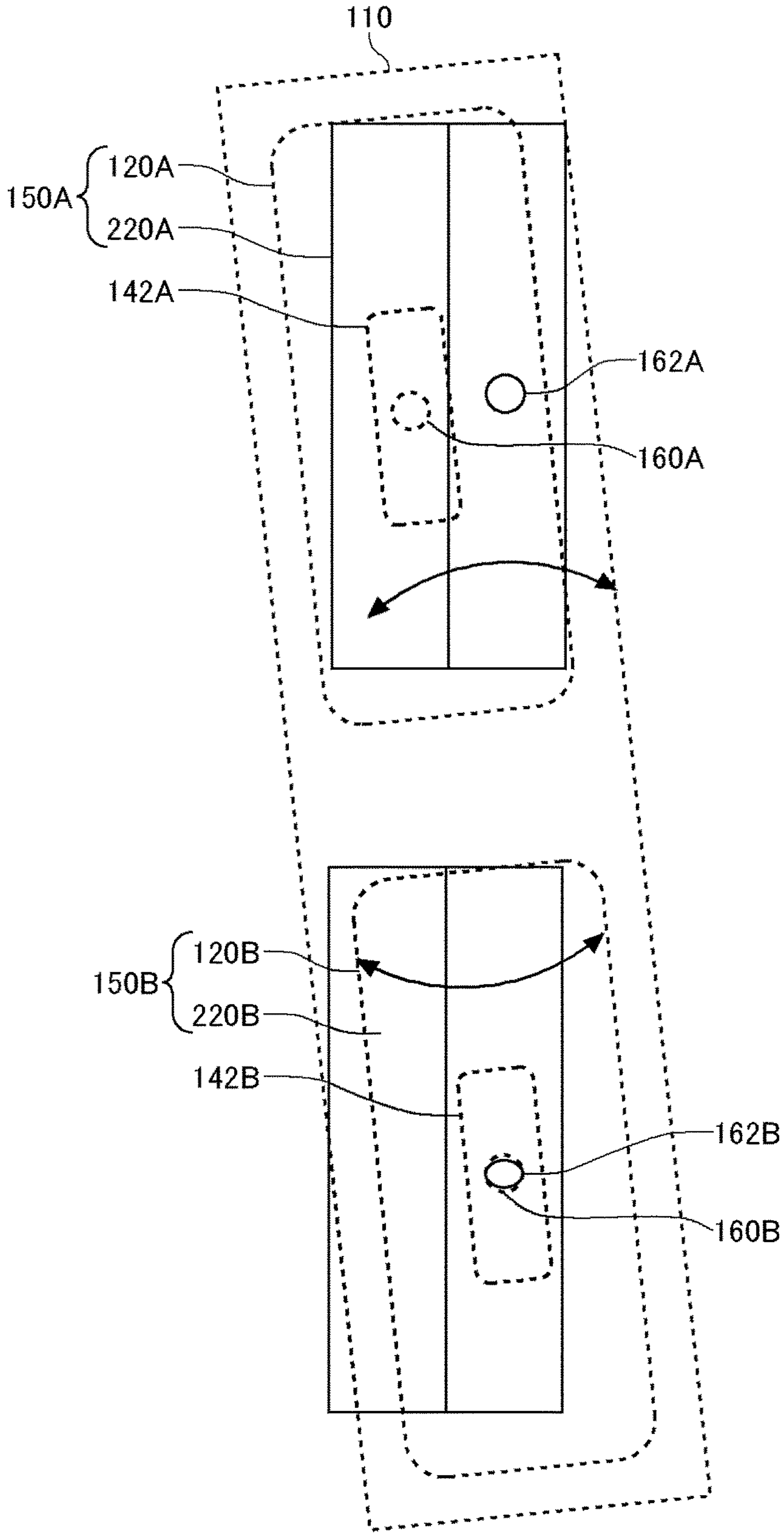
FIG. 2 shows how a movable member 110 is driven by two electromagnetic actuators 150A, 150B.

FIG. 2 shows how the movable member 110 is driven by two electromagnetic actuators 150A, 150B. When driving the movable member 110 by the electromagnetic actuators 150A, 150B, in a state where a position 160B of a position sensor 142B which is moved by driving of one electromagnetic actuator, 150B, reaches a target position 162B for a magnet 220B, a position 160A of a position sensor 142A which is moved by driving of another electromagnetic actuator, 150A, may not reach a target position 162A for a magnet 220A. In such a case, current further flows in an air-core coil 120A of another electromagnetic actuator, 150A, such that the position 160A of the position sensor 142A reaches the target position 162A for the magnet 220A. In this manner, once the position 160A of the position sensor 142A reaches the target position 162A for the magnet 220A, the position 160B of the position sensor 142B is deviated for the target position 162B for the magnet 220B. By repeating this, current continually flows in the air-core coils 120A, 120B, thus electrical power consumed in the electromagnetic actuators 150A, 150B may increase.

There may be a case where the position 160A of the position sensor 142A does not reach the target position 162A for the magnet 220A, and the position 142B of the position sensor 160B does not reach the target position 162B for the magnet 220B. In such a case, in a state where the movable member 110 maintains its present posture, current continually flows in the air-core coil 120A of the electromagnetic actuator 150A such that the position 160A of the position sensor 142A reaches the target position 162A for the magnet 220A, and current also continually flows in the air-core coil 120B of the electromagnetic actuator 150B such that the position 160B of the position sensor 142B reaches the target position 162B for the magnet 220B. In this manner, electrical power consumed in the electromagnetic actuators 150A, 150B may increase.

These phenomena occur because a solution of a simultaneous equation for a sensed position of the movable member 110 and a target position cannot be derived as shown below, due to a position deviation between a position of the movable member 110 sensed with the position sensors 142A, 142B and an actual position of the movable member 110 caused by a manufacturing error of the position sensors 142A, 142B, an influence of a magnetic field existing in the surroundings other than the magnetic field of the magnets 220A, 220B, or the like. An increase in electrical power consumption due to a failure to derive the solution of the simultaneous equation may then be caused when the electromagnetic actuators 150A, 150B are controlled independently. That is, it may be caused when a detection result of the position sensor 142A is used for a feedback control of the electromagnetic actuator 150A and not used for a feedback control of the electromagnetic actuator 150B, whereas a detection result of the position sensor 142B is used for the feedback control of the electromagnetic actuator 150B and not used for the feedback control such as a PID control of the electromagnetic actuator 150A.

Such phenomena can be prevented if each target position of the movable member 110 for reaching a target posture of the movable member 110 matches each position detected by each position sensor 142. That is, such phenomena can be prevented if each target position of the movable member 110 for reaching the target posture of the movable member 110 can be accurately derived in consideration of a position deviation in each position sensor 142.

Figure 3:
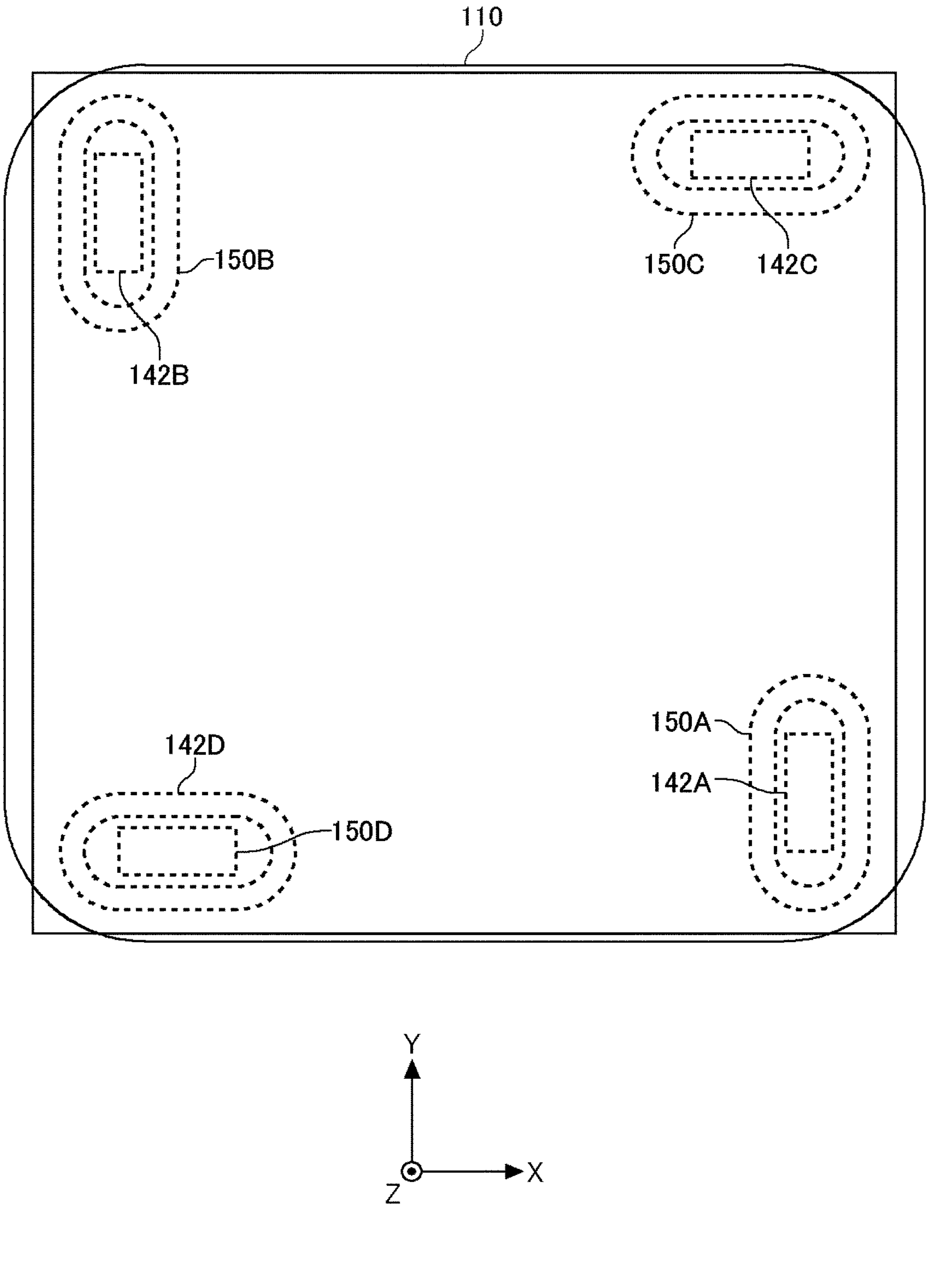
FIG. 3 shows a state where four electromagnetic actuators 150A, 150B, 150C, 150D, and four position sensors 142A, 142B, 142C, 142D are arranged above a substrate.

FIG. 3 shows a state where four electromagnetic actuators 150A, 150B, 150C, 150D (hereinafter, they may be collectively referred to as the electromagnetic actuators 150) and four position sensors 142A, 142B, 142C, 142D (hereinafter, they may be collectively referred to as the position sensors 142) are arranged above the movable member 110. For example, during image capturing, a user may move or rotate the image capturing apparatus in a direction such as an X-direction, a Y-direction, a Z-direction, at an angle $\theta_X$, an angle $\theta_Y$, and an angle $\theta_Z$. The angle $\theta_X$, the angle $\theta_Y$, and the angle $\theta_Z$ represent a rotation angle around an X axis, a rotation angle around a Y axis, and a rotation angle around a Z axis, respectively. Therefore, the image capturing apparatus has a function of detecting a moving direction and a rotation direction of itself, and moving or rotating an optical system such as the lens or the image capturing element to a direction opposite to the detected moving direction to correct an image shake. In the present embodiment, upon receiving thrusts from the four electromagnetic actuators 150, the movable member 110, with three degrees of freedom, moves in the X-direction and the Y-direction and rotates on a rotational axis along the Z axis perpendicular to an XY plane at an angle θ (hereinafter, a notation of Z for $\theta_Z$ is omitted). The X-direction is an example of a "first direction", and the Y-direction is an example of a "second direction". In this case, the Z axis corresponds to a "first rotational axis intersecting with a plane along the first direction and the second direction". Also, the X axis is an example of a "second rotational axis".

Figure 4A:
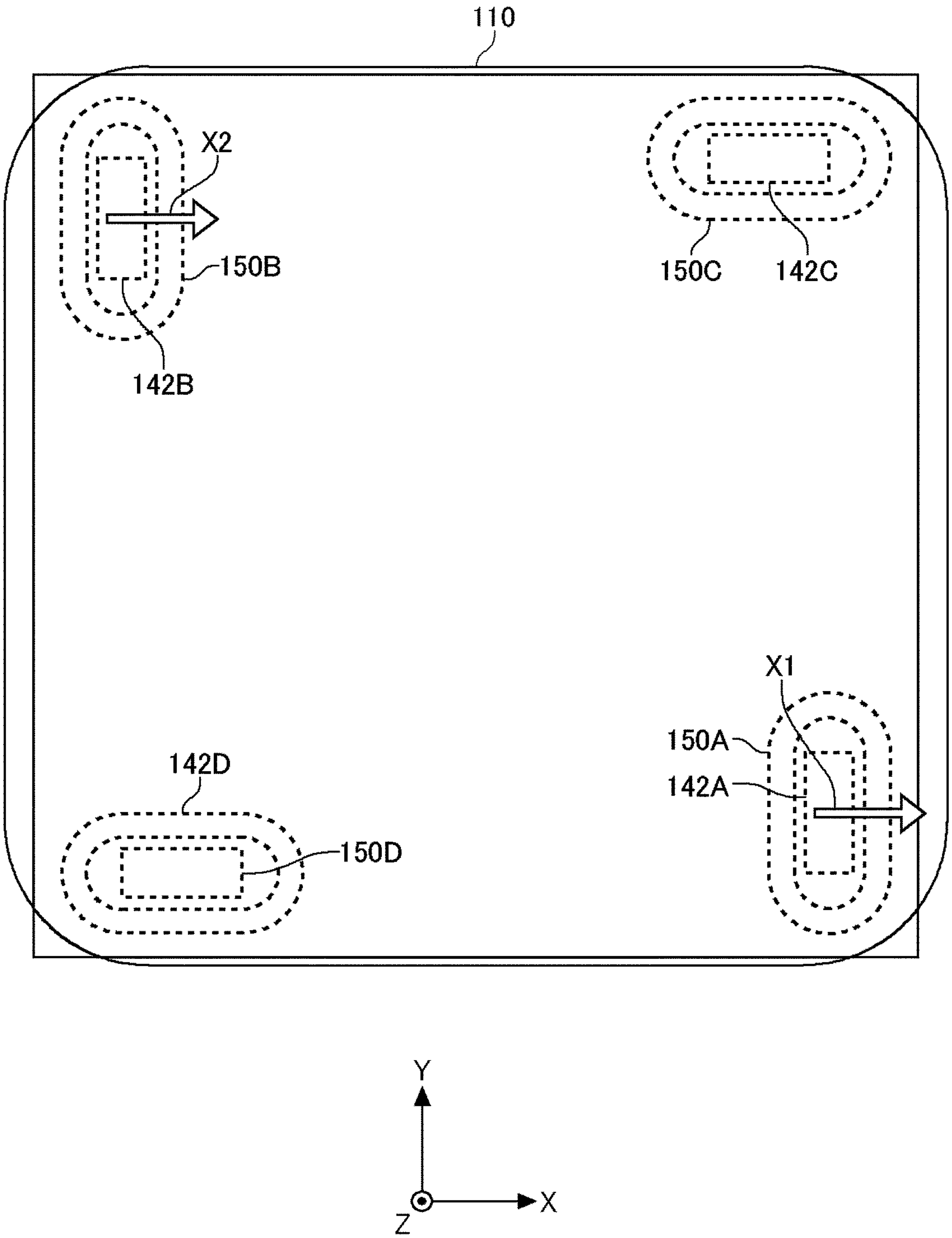
FIG. 4A illustrates that the electromagnetic actuator 150 gives a thrust of a component in an X-direction to the movable member 110.
Figure 4B:
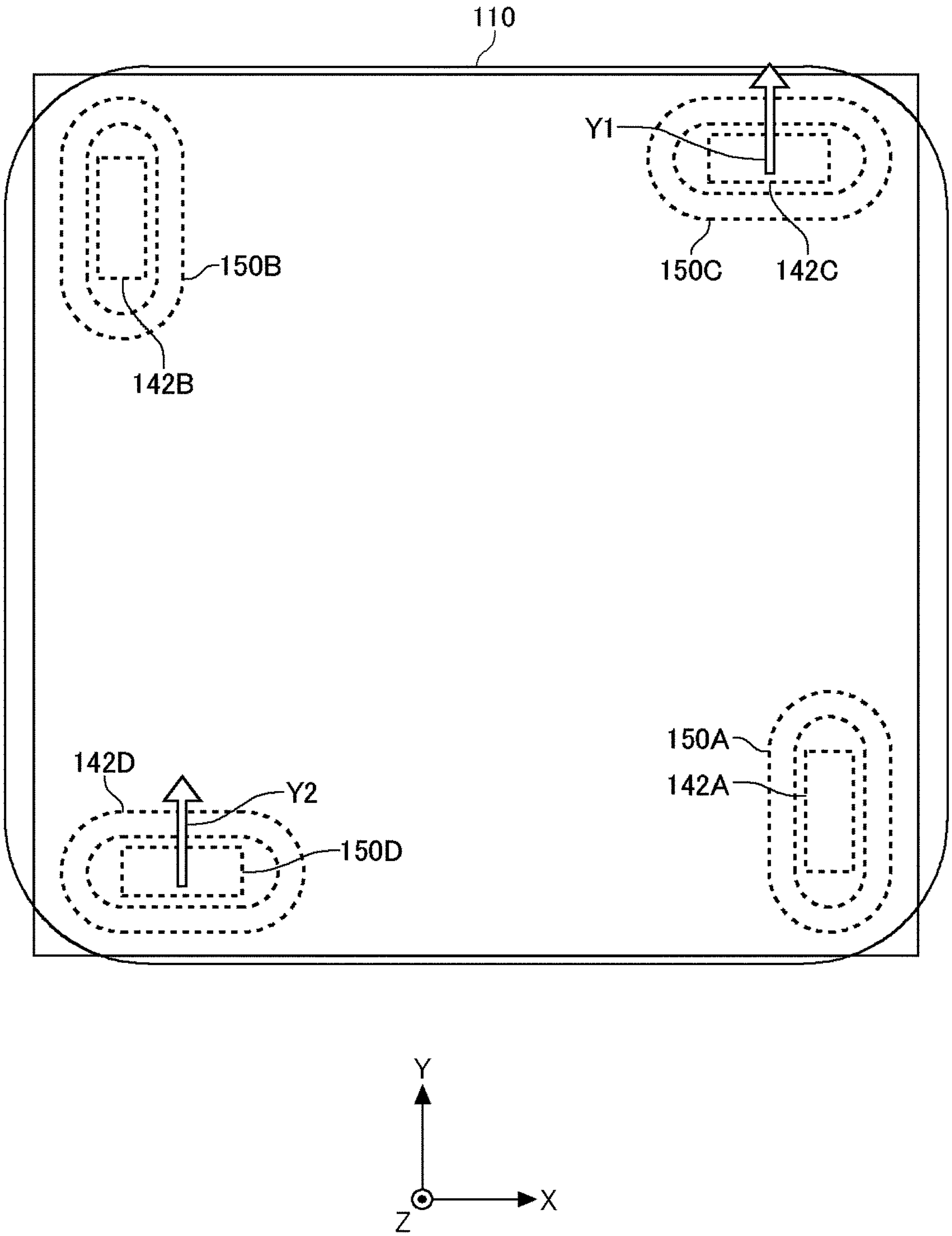
FIG. 4B illustrates that the electromagnetic actuator 150 gives a thrust of a component in a Y-direction to the movable member 110.
Figure 4C:
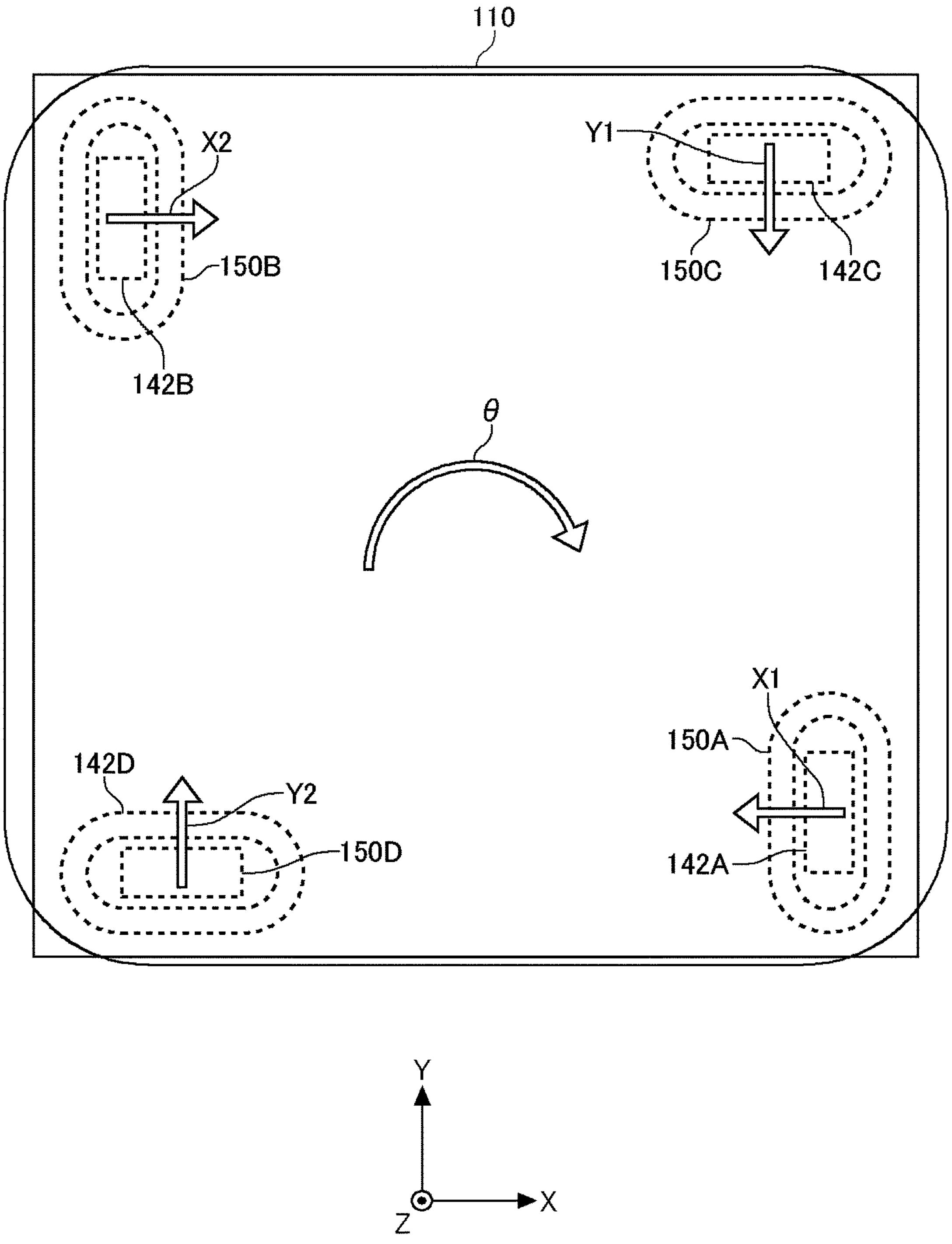
FIG. 4C illustrates that the electromagnetic actuator 150 gives a thrust of a component of a rotation to the movable member 110.
Figure 4D:
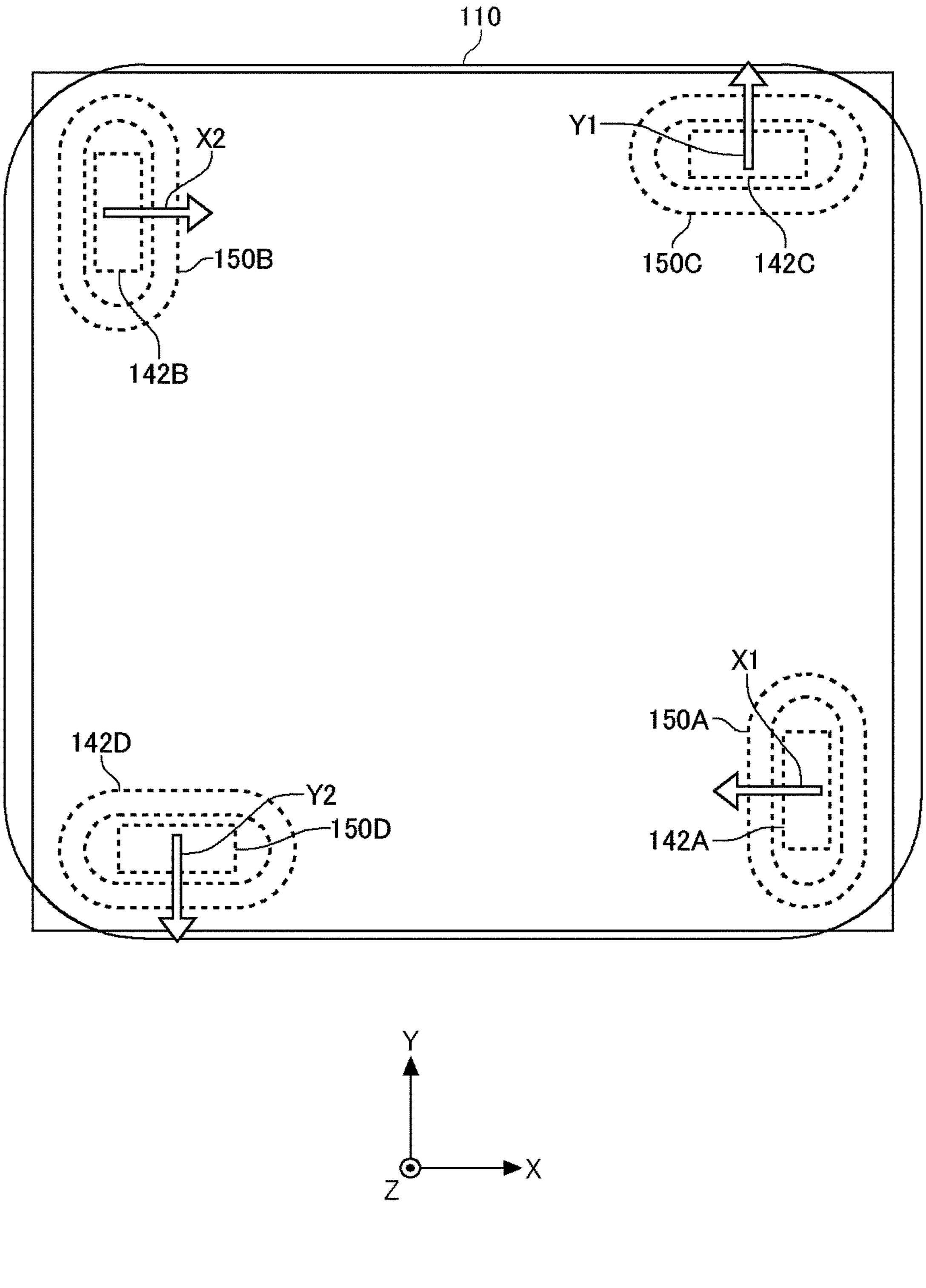
FIG. 4D illustrates an excess degree of freedom component given by the electromagnetic actuator 150 to the movable member 110.

As shown in FIG. 4A, the electromagnetic actuators 150A, 150B give the movable member 110 thrusts of a component X1 and a component X2 in the X-direction in a coordinate system of the movable member 110. As shown in FIG. 4B, the electromagnetic actuators 150C, 150D give the movable member 110 thrusts of a component Y1 and a component Y2 in the Y-direction in an XY coordinate system of the movable member 110. Also, as shown in FIG. 4C, the electromagnetic actuators 150A, 150B, 150C, 150D give the movable member 110 a thrust of a rotational component θ by a synthesis of respective thrust component X1, component X2, component X3, and component X4. Moreover, as shown in FIG. 4D, if an error is included in positions detected by the position sensors 142, an excess degree of freedom component R which does not contribute to a movement and a rotation of the movable member 110 and originally should not exist, exists in addition to degrees of freedom components X and Y, and the rotational component θ which contribute to the movement and the rotation of the movable member 110.

Here, a position of the electromagnetic actuator 150A in a coordinate system A detected by the position sensor 142A is denoted by x1. A position of the electromagnetic actuator

150B in a coordinate system B detected by the position sensor 142B is denoted by x2. A position of the electromagnetic actuator 150C in a coordinate system C detected by the position sensor 142C is denoted by y1. A position of the electromagnetic actuator 150D in a coordinate system D detected by the position sensor 142D is denoted by y2. In addition, measurement positions measured by position sensors 142 are denoted by $x1_O$, $x2_O$, $y1_O$, $y2_O$, and each target position that should be detected by each position sensor 142 corresponding to target postures (X, Y, θ) is denoted by $x1_T$, $x2_T$, $y1_T$, $y2_T$.

A relationship between the target postures (X, Y, θ) and the target positions ($x1_T$, $x2_T$, $y1_T$, $y2_T$) can be mathematically expressed by the following equation (1).

$$\begin{pmatrix} x1_T \\ x2_T \\ y1_T \\ y2_T \end{pmatrix} = \begin{pmatrix} 1 & 0 & -1 \\ 1 & 0 & +1 \\ 0 & 1 & +1 \\ 0 & 1 & -1 \end{pmatrix} \begin{pmatrix} X \\ Y \\ \theta \end{pmatrix} \tag{1}$$

In deriving the target positions ($x1_T$, $x2_T$, $y1_T$, $y2_T$) satisfying the target postures (X, Y, θ), a drive behavior is essentially influenced by whether or not there is the solution of the simultaneous equation satisfying the measurement positions ($x1_O$, $x2_O$, $y1_O$, $y2_O$) denoted by four variables for three variables (X, Y, θ). In this case, a relational equation between the variables (X, Y, θ) and the variables ($x1_O$, $x2_O$, $y1_O$, $y2_O$) is expressed by the following equation (2).

$$\begin{pmatrix} X \\ Y \\ \theta \end{pmatrix} = \frac{1}{2} \begin{pmatrix} 1 & 1 & 0 & 0 \\ 0 & 0 & 1 & 1 \\ -1 & 1 & -1 & 1 \end{pmatrix} \begin{pmatrix} x1_O \\ x2_O \\ y1_O \\ y2_O \end{pmatrix} \tag{2}$$

However, as described above, positions detected by the position sensors 142 have a possibility of including the error. Therefore, there may be a case where the solution of the simultaneous equation satisfying the measurement positions ($x1_O$, $x2_O$, $y1_O$, $y2_O$) denoted by the four variables for the three variables (X, Y, θ) cannot be derived. In such case where the solution cannot be derived, the posture of the movable member 110 cannot be brought into the target posture, and there is a possibility of an increase in electrical power consumed in each electromagnetic actuator 150.

Therefore, in consideration of the excess degree of freedom component R, the solution of the simultaneous equation satisfying the target positions ($x1_T$, $x2_T$, $y1_T$, $y2_T$) which are the four variables for the four variables (X, Y, θ, R) will be derived as shown in the following equation (3).

$$\begin{pmatrix} x1_T \\ x2_T \\ y1_T \\ y2_T \end{pmatrix} = \begin{pmatrix} 1 & 0 & -1 & -1 \\ 1 & 0 & +1 & +1 \\ 0 & 1 & -1 & +1 \\ 0 & 1 & +1 & -1 \end{pmatrix} \begin{pmatrix} X \\ Y \\ \theta \\ R \end{pmatrix} \tag{3}$$

With the numerical equation having the above-described matrix, the solution for each of $x1_T$, $x2_T$, $y1_T$, $y2_T$ can be derived even when the error is included in the positions detected by the position sensors 142.

The excess degree of freedom component R may be derived from the following equation (4) having each reference point of the movable member 110 detected by the position sensors 142, for example, the measurement positions $x1_O$, $x2_O$, $y1_O$, $y2_O$ of the movable member 110 detected by the position sensors 142, as variables.

$$\begin{pmatrix} X \\ Y \\ \theta \\ R \end{pmatrix} = \frac{1}{2} \begin{pmatrix} 1 & 1 & 0 & 0 \\ 0 & 0 & 1 & 1 \\ -1 & 1 & -1 & 1 \\ -1 & 1 & 1 & -1 \end{pmatrix} \begin{pmatrix} x1_O \\ x2_O \\ y1_O \\ y2_O \end{pmatrix} \tag{4}$$

That is, the excess degree of freedom component R may be derived based on values corresponding to positions of the reference points detected by the position sensors 142 and the numerical equation having the above-described 4×4 matrix. Note that each component of the numerical equation having the 4×4 matrix of the equation (4) is an example, and may be adjusted according to a magnetic characteristic of each position sensor 142, the positions detected by the position sensors 142, the target positions, or the like. In addition, after deriving the R using the equation (4), a feedback control is performed to move each position of each reference point to each target position according to the equation (3). At the time of this feedback control, the target positions may be adjusted by performing an arithmetic processing that multiplies the R with a predefined scale.

Figure 5:
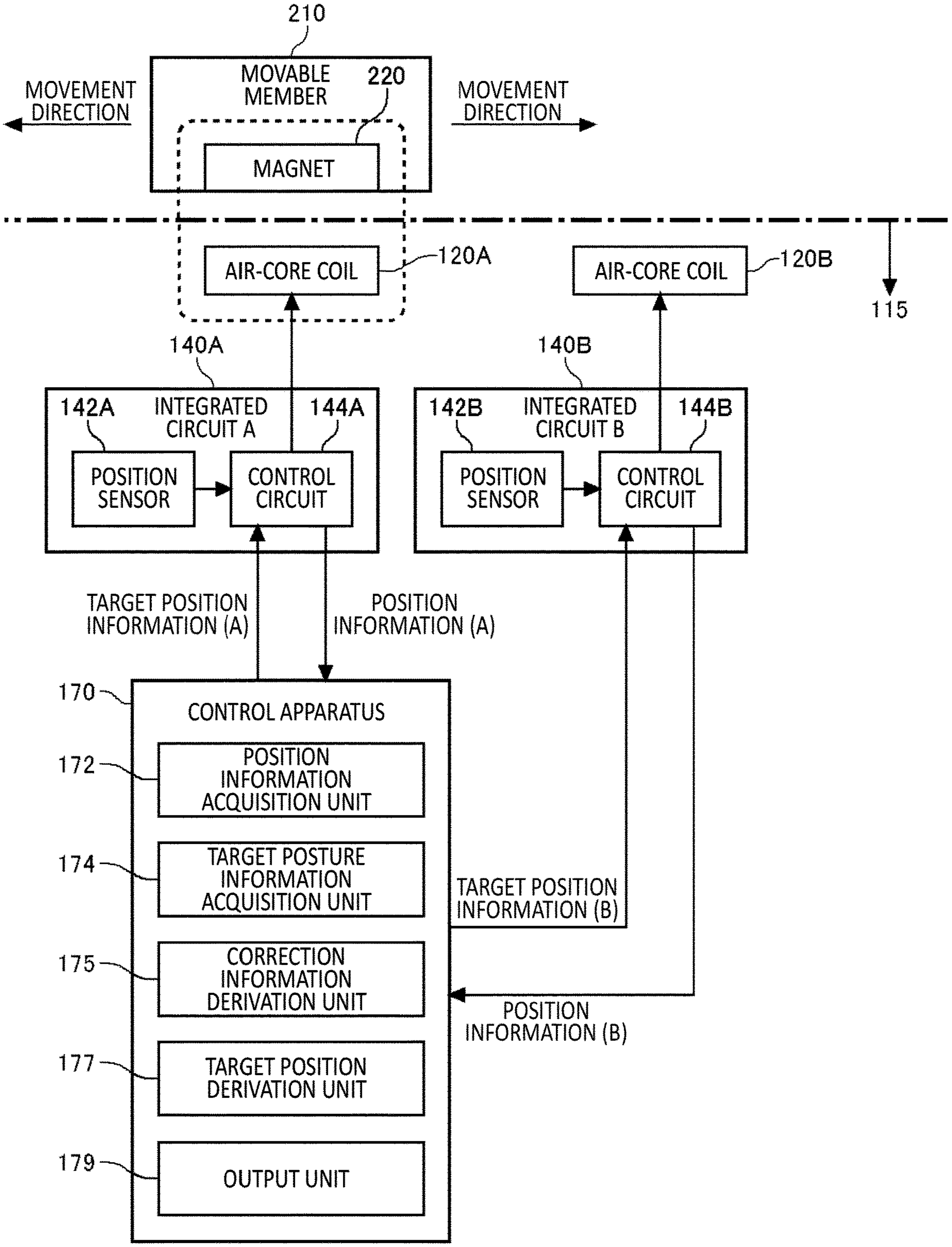
FIG. 5 shows an example of a configuration of a position adjustment apparatus 115 which controls a movement of a movable member 210.

FIG. 5 shows an example of a configuration of a position adjustment apparatus 115 which controls movement of a movable member 210. The position adjustment apparatus 115 detects a position of the movable member 210 and adjusts the movable member 210 to a target position. The position adjustment apparatus 115 comprises a plurality of the air-core coils 120A, 120B, a plurality of the integrated circuits 140A, 140B, and a control apparatus 170.

In the embodiment shown in FIG. 1, the movable member 110 is a substrate equipped with the air-core coil 120, and the substrate 200 was equipped with the magnet 220. In the present embodiment, the movable member 210 equipped with the magnet 220 moves for a substrate on which the position adjustment apparatus 115 is equipped. Similar to the embodiment in FIG. 1, an electromagnetic actuator for driving the movable member 210 is formed of the air-core coil 120A and the magnet 220. In the present embodiment, a case where the movable member 210 translates for the integrated circuits 140A, 140B will be described. If the movable member 210 is a lens frame, the movable member 210 translates along an optical axis of a lens system. In the present embodiment, when the magnet 220 approaches the air-core coil 120A, the electromagnetic actuator is formed of the air-core coil 120A and the magnet 220. On the other hand, when the magnet 220 approaches the air-core coil 120B, the electromagnetic actuator is formed of the air-core coil 120B and the magnet 220.

The movable member 210 is provided with the magnet 220. As an example, the movable member 210 is the lens frame which holds the lens system included in the image capturing apparatus. The image capturing apparatus is equipped, for example, in a smartphone, a head-mounted display, or the like utilized in VR (virtual reality), XR (cross reality), or the like. If the lens system equipped in such an image capturing apparatus has a zoom function, a drive range of the lens system tends to be wider. On the other hand, if the movable member 210 is driven by the electromagnetic actuator as described above, there is a limit in the drive range where the movable member 210 can be driven by one air-core coil 120. Therefore, in order to increase the drive range of the movable member 210, the position adjustment apparatus 115 comprises the plurality of air-core coils 120A, 120B. The movable member 210 is then driven while switching between the integrated circuit 140A and integrated circuit 140B according to the position of the movable member 210.

The integrated circuit 140A detects the position of the movable member 210 and controls the electromagnetic actuator to move the movable member 210 to the target position based on the detected position. The integrated circuit 140A may be a Driver Integrated Circuit (DIC) which controls an electromagnetic field generated in the electromagnetic actuator. The integrated circuit 140A includes the position sensor 142A and a control circuit 144A. The position sensor 142A and the control circuit 144A may be included in the integrated circuit 140A in an integrated manner.

The position sensor 142A detects the position of the movable member 210. The position sensor 142A outputs position information (A) indicating the detected position of the movable member 210 to the control circuit 144A. Note that the position sensor 142A is provided at a position different from that of the position sensor 142B provided in the integrated circuit 140B relative to the movable member 210. For example, the position sensors 142 are provided at equal intervals along a moving direction of the movable member 210.

In the present embodiment, the position sensor 142A transmits the position information (A) to the control apparatus 170 via the control circuit 144A. Note that the position sensor 142A may transmit the position information (A) to both the control circuit 144A and the control apparatus 170.

The control circuit 144A controls current flowing in the air-core coil 120A based on the position information (A) of the movable member 210 and a target position information (A) received from the control apparatus 170 described below. Therefore, the electromagnetic actuator moves the movable member 210 to the target position (A) by the electromagnetic force. The control circuit 144A controls the electromagnetic field generated in the electromagnetic actuator with the corresponding air-core coil 120A and the magnet 220, independently from the electromagnetic actuator with a control circuit 144B, the air-core coil 120B and the magnet 220.

The integrated circuit 140B has a same configuration as that of the integrated circuit 140A. Therefore, the integrated circuit 140B includes the position sensor 142B and the control circuit 144B, and the position sensor 142B transmits position information (B) to the control apparatus 170 via the control circuit 144B. The control circuit 144B controls current flowing in the air-core coil 120B to move the movable member 210 to a target position (B) by the electromagnetic force.

Here, the position sensor 142A corresponds to a "first position sensor", and the position information (A) corresponds to "first position information". The position sensor 142B corresponds to a "second position sensor", and the position information (B) corresponds to "second position information". The electromagnetic actuator formed of the air-core coil 120A and the magnet 220 corresponds to a "first driving source," and the electromagnetic actuator formed of the air-core coil 120B and the magnet 220 corresponds to a "second driving source."

In the following, the control actually performed in the integrated circuits 140A, 140B will be described with specific examples, based on a relative position between the movable member 210 and the integrated circuits 140A, 140B. A method by which the control apparatus 170 implements the control will then be described.

Figure 6:
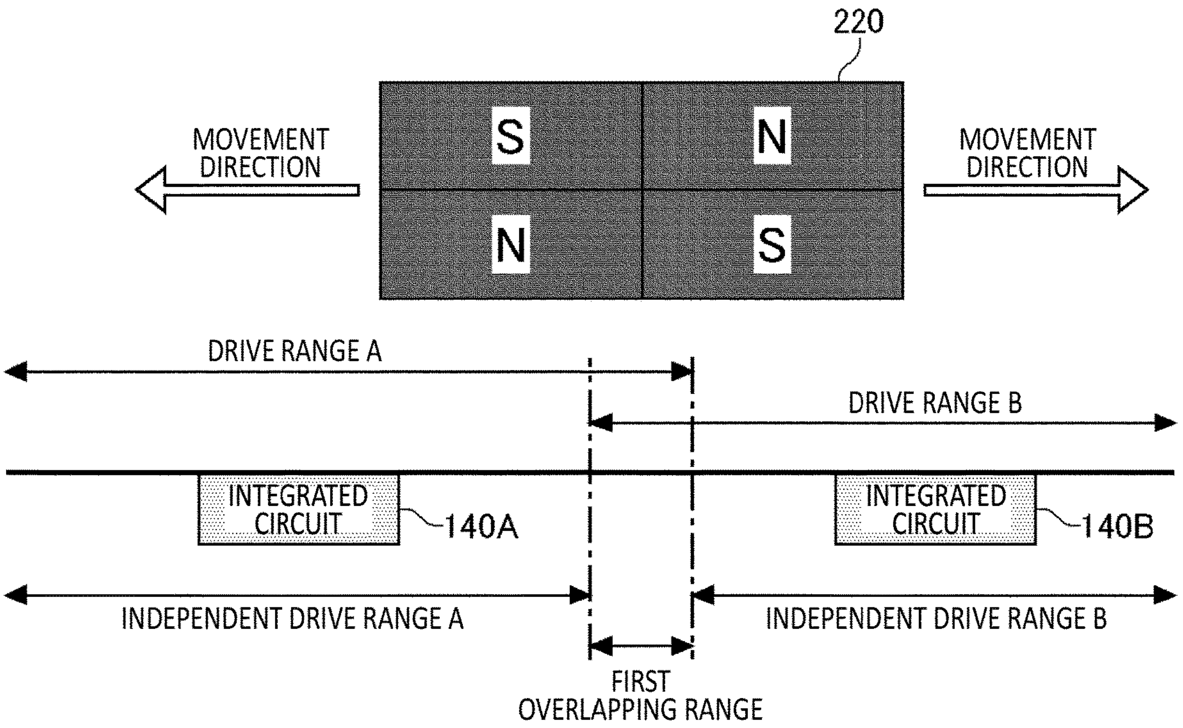
FIG. 6 shows an example of a schematic of a drive control, based on an arrangement of a magnet 220, and integrated circuits 140A, 140B.

FIG. 6 shows an example of a schematic of the drive control, based on the arrangement of the magnet 220 and the integrated circuits 140A, 140B. The integrated circuit 140A drives the movable member 210 when the magnet 220 is in a drive range A. On the other hand, the integrated circuit 140B drives the movable member 210 when the movable member 210 is in a drive range B.

The integrated circuit 140A is an example of a "first integrated circuit" and the drive range A is an example of a "first drive range". Similarly, the integrated circuit 140B is an example of a "second integrated circuit" and the drive range B is an example of a "second drive range".

The drive range A and the drive range B have an overlapping range. The overlapping range of the drive ranges of the integrated circuits 140A, 140B is an example of a "first overlapping range".

In a range where the drive range A and the drive range B do not overlap, the movement of the magnet 220 can be controlled by either one of the integrated circuit 140A or the integrated circuit 140B. When the magnet 220 is located near the integrated circuit 140A but sufficiently separated from the integrated circuit 140B, the integrated circuit 140A drives the magnet 220 independently. In the following, such a range is referred to as an "independent drive range A." On the other hand, when the magnet 220 is located near the integrated circuit 140B but sufficiently separated from the integrated circuit 140A, the integrated circuit 140B drives the magnet 220 independently. In the following, such a range is referred to as an "independent drive range B".

In the first overlapping range where the drive range A of the integrated circuit 140A and the drive range B of the integrated circuit 140B overlap, one of the integrated circuits 140A or 140B attempt to move the movable member 110 independently from another so that the controls of the integrated circuits 140A, 140B as described above may interfere. This will be further described supplementarily with reference to FIG. 7A to FIG. 7C.

Figure 7A:
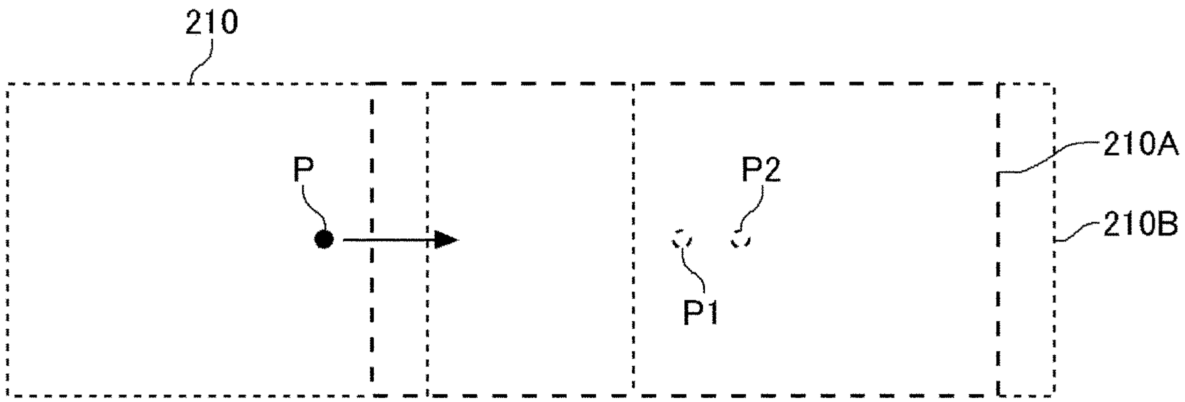
FIG. 7A shows an example of a relationship between a current position P of the movable member 210, a target position P1 of an integrated circuit 140A, and a target position P2 of an integrated circuit 140B.
Figure 7B:
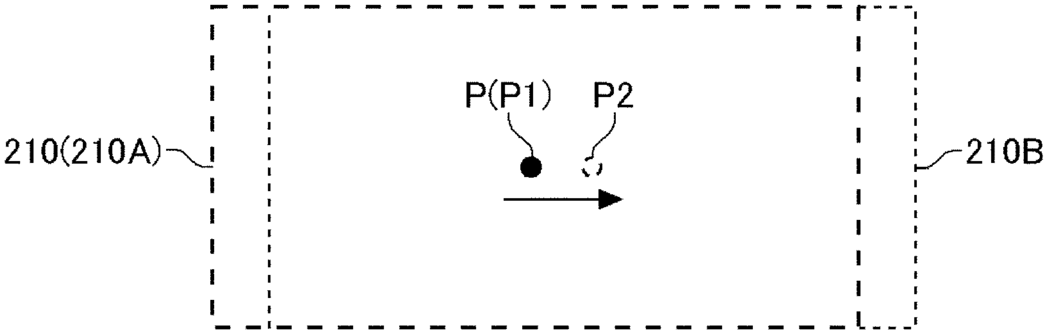
FIG. 7B shows an example of a relationship between the current position P of the movable member 210, the target position P1 of the integrated circuit 140A, and the target position P2 of the integrated circuit 140B.
Figure 7C:
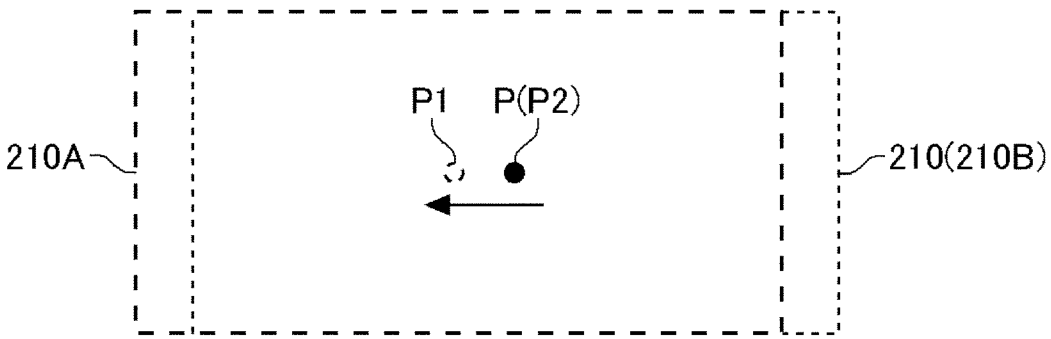
FIG. 7C shows an example of a relationship between the current position P of the movable member 210, the target position P1 of the integrated circuit 140A, and the target position P2 of the integrated circuit 140B.

FIG. 7A, FIG. 7B, and FIG. 7C show the relationship between a current position P of the movable member 210, a target position P1 of the integrated circuit 140A, and a target position P2 of the integrated circuit 140B. A reference numeral 210A indicates the movable member 210 when located at the target position P1, and a reference numeral 210B indicates the movable member 210 when located at the target position P2. The integrated circuit 140A drives the movable member 210 located at the position P to translate it to the target position P1. On the other hand, the integrated circuit 140B drives the movable member 210 located at the position P to translate it to the target position P2.

In FIG. 7B, the movable member 210 has reached the target position P1 of the integrated circuit 140A. However, the target position P2 of the integrated circuit 140B is deviated from the target position P1, and the integrated circuit 140B supplies current to the air-core coil 120B to further move the movable member 210 to the target position P2.

In FIG. 7C, in contrast to FIG. 7B, the movable member 210 has reached the target position P2 of the integrated circuit 140B. In this case, the integrated circuit 140A supplies current to the air-core coil 120A to further move the movable member 210 to the target position P1. Therefore, through repeated operations of the electromagnetic actuators in FIG. 7B and FIG. 7C, current may continually flow in the air-core coils 120A, 120B, thus electrical power consumed in the electromagnetic actuators may increase.

Alternatively, the position P may be located between the target positions P1 and P2. In this case, the integrated circuit 140A controls the movable member 210 to move it to the target position P1, and the integrated circuit 140B controls the movable member 210 to move it to the target position P2. When these forces are balanced, or alternatively when the difference between these forces does not exceed a static friction force, or the like, current continues to flow in the air-core coils 120A, 120B while the movable member 210 maintains its present posture.

In order to prevent this, introducing the excess degree of freedom component R in the first overlapping range as described above can be considered. That is, a measurement position of the movable member 210 of the integrated circuit 140A is denoted by $x1_O$ and a target position of the integrated circuit 140A is denoted by $x1_T$, the measurement position of the movable member 210 of the integrated circuit 140B is denoted by $x2_O$ and the target position of the integrated circuit 140B is denoted by $x2_T$. In this case, in the first overlapping range, the target position (the target posture) $x_T$ of the movable member 210 for the position adjustment apparatus 115 is given by $x_T=(x1_T+x2_T)/2$ (i.e., at center of mass of $x1_T$, $x2_T$). Note that the target position $x_T$ is a value indicated in a drive command for the movable member 210 input from the outside. For example, if the movable member 210 is a zoom lens, it may be a value indicated in a zoom instruction which indicates a zoom position of the zoom lens. Further, using the excess degree of freedom component R where $R=-x1_O+x2_O$, $x1_T$, $x2_T$ in the first overlapping range are given by:

$$\begin{aligned} x1_T &= x_T - R/2, \\ x2_T &= x_T + R/2 \end{aligned}.$$

Therefore, a transformation matrix between a coordinate system of $x1_T$, $x2_T$ and a coordinate system of $x_T$, R is given by the following equation (5).

$$\begin{pmatrix} x1_T \\ x2_T \end{pmatrix} = \begin{pmatrix} 1 & -\frac{1}{2} \\ 1 & \frac{1}{2} \end{pmatrix} \begin{pmatrix} x_T \\ R \end{pmatrix} \tag{5}$$

The transformation matrix is a 2-by-2 matrix for two variables. This simultaneous equation is solvable, and in this case, the target positions of $x1_T$, $x2_T$ are derived without deviation. That is, in the first overlapping range, misalignments between the target positions can be prevented by deriving the target positions $x1_T$, $x2_T$ of the integrated circuits 140A, 140B using the excess degree of freedom component R, so that current can be prevented from continuing to flow wastefully to the air-core coils 120A, 120B.

However, with the position adjustment apparatus 115 according to the present embodiment, the movable member 210 moves in the independent drive range A and the independent drive range B, as well as in the first overlapping range. That is, there exist a case where the integrated circuits 140A, 140B drive independently to move the movable member 210 and a case where they jointly drive to move the movable member 210.

In such cases, turning on and off current flowing in the integrated circuits 140A, 140B can be considered, between the first overlapping range and the independent drive range A, or between the first overlapping range and the independent drive range B, in order to drive either of the integrated circuits 140A, 140B which needs to be driven alone. However, large current may flow in the air-core coils 120A, 120B at the timing of turning on, and the movable member 210 may not be able to be driven stably at the timing of switching between the integrated circuits 140A and 140B. In addition, since the integrated circuits 140A, 140B operate with their individual algorithms, the movable member 210, again, may not be able to be driven stably at the timing when those algorithms are switched.

As described above, in the first overlapping range, it is preferable to derive target positions of the movable member 210 for the plurality of the integrated circuits 140A, 140B according to the algorithms which take into account the excess degree of freedom component R. However, if each of the integrated circuits 140 operates with individual algorithm in the independent drive ranges A, B where the integrated circuits 140A, 140B drive independently, and in the first overlapping range where the plurality of the integrated circuits 140A, 140B drive, again, current flowing in the air-core coils 120A, 120B may not be stable at the timing of switching between the independent drive ranges A, B and the first overlapping range, and the movable member 210 may not be able to be driven stably.

Therefore, the present embodiment provides a mechanism to prevent current flowing in the air-core coils 120A, 120B from being switched on and off at the timing of switching between the integrated circuits 140A and 140B to be driven, and further, to prevent the algorithms with which the respective integrated circuits 140A, 140B operate from being switched at the timing of switching between the integrated circuits 140A and 140B to be driven, while taking into account the excess degree of freedom component R in the overlapping range.

More specifically, it causes the integrated circuits 140A, 140B to operate in the independent drive ranges A, B as well, utilizing the algorithm which achieves operations using the excess degree of freedom component R. To achieve this operation, an algorithm using the following equation is employed to derive the respective target positions $x1_T$, $x2_T$ by introducing a set of coefficients using a coefficient a predefined according to the position of the movable member 210 for the excess degree of freedom component R, so that a contribution ratio of the excess degree of freedom component R when deriving the target positions $x1_T$, $x2_T$ varies according to the position of the movable member 210.

$$\begin{aligned} x1_T &= x_T - aR, \\ x2_T &= x_T + (1-a)R \end{aligned}.$$

Here, a satisfies $0 \leq a \leq 1$. When the movable member 210 is outside the first overlapping range within the drive range A, i.e., in the independent drive range A, the integrated circuit 140A may move the movable member 210 according to the target position $x_T$, so the target position $x_T$ may be given as the target position $x1_T$ of the integrated circuit 140A. Further, a value obtained by adding the difference between the measurement position $x1_O$ of the movable member 210 of the integrated circuit 140A and the measurement position $x2_O$ of the movable member 210 of the integrated circuit 140B may be given to the target position $x_T$ as the target position $x2_T$ of the integrated circuit 140B. That is, a value obtained by adding the excess component R ($=-x1_O+x2_O$) may be given to the target position $x_T$ as the target position $x2_T$ of the integrated circuit 140B. In this manner, in a state where the position of the movable member

210 has reached the target position $x_T$ and come to a standstill, $x1_O$ becomes $x_T$, thus the target position $x2_T$ becomes the measurement position $x2_O$ ($x2_T=x_T+R=x1_O-x1_O+x2_O=x2_O$), and the integrated circuit 140B also determines that the movable member 210 has reached the target position, thereby current no longer flows in the integrated circuit 140B either. This can be achieved by setting a to 0. That is, in the independent drive range A, the target positions $x1_T$, $x2_T$ can be expressed by the following equation.

$$\begin{aligned} x1_T &= x_T, \\ x2_T &= x_T + R \end{aligned}.$$

On the other hand, when the movable member 210 is outside the first overlapping range within the drive range B, i.e., in the independent drive range B, the integrated circuit 140B may move the movable member 210 according to the target position $x_T$, so the target position $x_T$ may be given as the target position $x2_T$ of the integrated circuit 140B. Further, a value obtained by subtracting the excess degree of freedom component R ($=-x1_O+x2_O$) may be given to the target position $x_T$ as the target position $x2_T$ of the integrated circuit 140A. This can be achieved by setting a to 1. That is, in the independent drive range B, the target positions $x1_T$, $x2_T$ can be expressed by the following equation.

$$\begin{aligned} x1_T &= x_T - R, \\ x2_T &= x_T \end{aligned}.$$

In this manner, in a state where the position of the movable member 210 has reached the target position $x_T$ and come to a standstill while located in the independent drive range B, $x2_O$ becomes $x_T$, thus the target position $x1_T$ becomes the measurement position $x1_O$ ($x1_T=x_T+R=x2_O-(-x1_O+x2_O)=x1_O$), and the integrated circuit 140A also determines that the movable member 210 has reached the target position, thereby current no longer flows in the integrated circuit 140A either.

Figure 8:
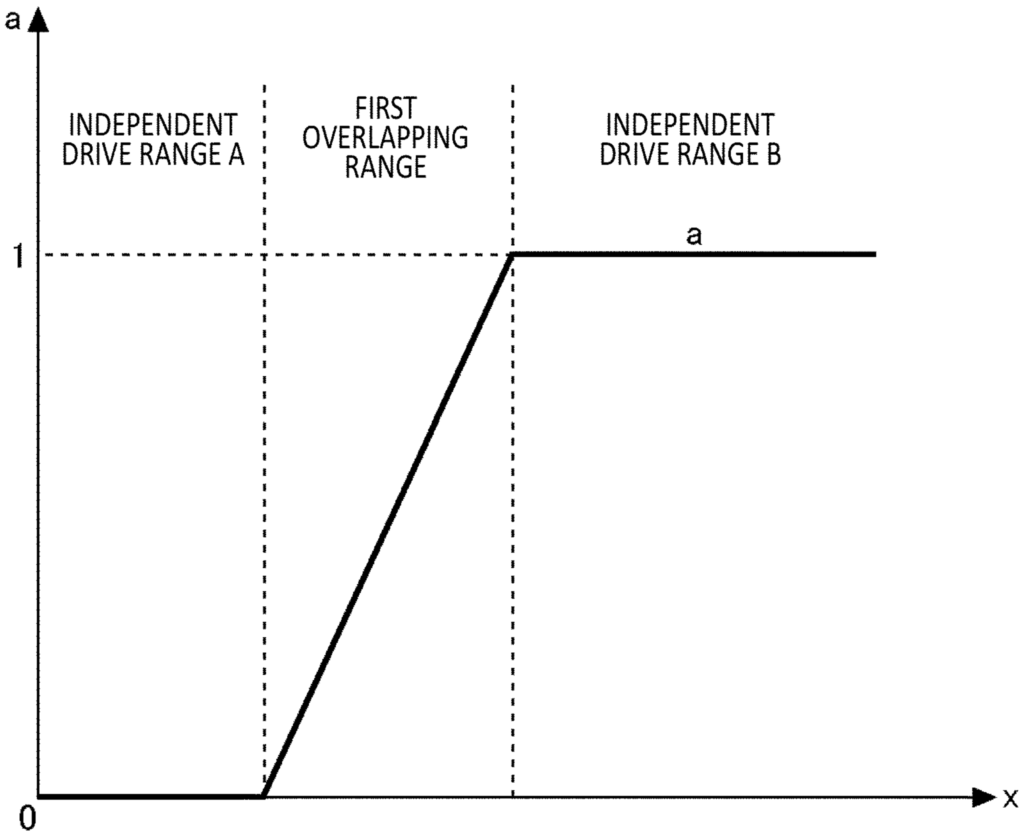
FIG. 8 shows a value of a coefficient of variation a according to an x-coordinate component of the position P of the movable member 210.

In the first overlapping range, as shown in FIG. 8, the set of coefficients using the coefficient a which varies according to the position of the movable member 210 is employed, such that a is 0 at a boundary position between the first overlapping range and the independent drive range A and a is 1 at the boundary position between the first overlapping range and the independent drive range B. In this manner, using the same algorithm for all the drive ranges, and besides, at the boundary position between the first overlapping range and the independent drive range A and at the boundary position between the first overlapping range and the independent drive range B, the integrated circuit 140A or the integrated circuit 140B is no longer turned on or off. Therefore, the movable member 210 can be driven stably in all the drive ranges.

In the present embodiment, the set of coefficients of $x1_T$ and $x2_T$ when a=0 at the independent drive range A and at a boundary of the independent drive range A and the first overlapping range is an example of a "first set of coefficients". Further, the set of coefficients of $x1_T$ and $x2_T$ when a=1 at the independent drive range B and at a boundary of the independent drive range B and the first overlapping range is an example of a "second set of coefficients".

When the movable member 210 is located in the independent drive range A, as the movable member 210 approaches the target position $x_T$ which is equal to the target position $x1_T$, the target position $x1_T$ approaches the measurement position $x1_O$ and the target position $x2_T$ also approaches the measurement position $x2_O$. The first set of coefficients is defined to satisfy such conditions. On the other hand, when the movable member 210 is located in the independent drive range B, as the movable member 210 approaches the target position $x_T$ which is equal to the target position $x21_T$, the target position $x2_T$ approaches the measurement position $x2_O$ and the target position $x1_T$ also approaches the measurement position $x1_O$. The second set of coefficients is defined to satisfy such conditions.

In the present embodiment, the excess degree of freedom component R is introduced by setting $R=-x1_O+x2_O$ in the first overlapping range. As actual derivation of the excess degree of freedom component R, a value of the component R can be derived as R which satisfies the equation specified between the measurement positions $x1_O$, $x2_O$ by the position sensors 142A, 142B, the measurement position $x_O$ of the movable member 210 for the position adjustment apparatus 115, and the excess degree of freedom component R, given by an inverse matrix of the relational equation which indicates transformation to be satisfied for the target positions $x1_T$, $x2_T$, $x_T$, component R in a matrix.

A transformation equation to be satisfied for the target positions $x1_T$, $x2_T$, $x_T$ and component R in the independent drive range A is, according to a determinant, the following equation (6).

$$\begin{pmatrix} x1_T \\ x2_T \end{pmatrix} = \begin{pmatrix} 1 & 0 \\ 1 & 1 \end{pmatrix} \begin{pmatrix} x_T \\ R \end{pmatrix} \tag{6}$$

Therefore, using the inverse matrix of this transformation matrix, the following equation (7) is established for the measurement positions $x1_O$, $x2_O$, $x_O$, and component R as the relational equation of an inverse function.

$$\begin{pmatrix} x_O \\ R \end{pmatrix} = \begin{pmatrix} 1 & 0 \\ -1 & 1 \end{pmatrix} \begin{pmatrix} x1_O \\ x2_O \end{pmatrix} \tag{7}$$

In the first overlapping range, the determinant to be satisfied for the target positions $x1_T$, $x2_T$, $x_T$ and component R is the following equation (8).

$$\begin{pmatrix} x1_T \\ x2_T \end{pmatrix} = \begin{pmatrix} 1 & -a \\ 1 & 1-a \end{pmatrix} \begin{pmatrix} x_T \\ R \end{pmatrix} \tag{8}$$

Using the inverse matrix of this transformation matrix, the following equation (9) is established for the measurement positions $x1_O$, $x2_O$, $x_O$ and component R as the relational equation of the inverse function.

$$\begin{pmatrix} x_O \\ R \end{pmatrix} = \begin{pmatrix} 1-a & a \\ -1 & 1 \end{pmatrix} \begin{pmatrix} x1_O \\ x2_O \end{pmatrix} \tag{9}$$

In this manner, the excess degree of freedom R is calculated based on the measurement positions $x1_O$, $x2_O$. Here, the coefficient of variation a is predefined according to the position of the movable member 210. Therefore, in the first overlapping range, correction information for the target positions $x1_T$, $x2_T$ is derived based on the measurement position $x1_O$ indicated by the position information (A) and the measurement position $x2_O$ indicated by the position information (B), using a set of coefficients of variation according to a predefined function which is based on the coefficient a.

When the movable member 210 exists at the boundary position between the independent drive range A and the first overlapping range, the set of coefficients of variation for the target positions $x1_T$, $x2_T$ is the same as the first set of coefficients. On the other hand, when it exists at the boundary position between the independent drive range B and the first overlapping range, the set of coefficients of variation for the target positions $x1_T$, $x2_T$ is the same as the second set of coefficients.

The transformation equation to be satisfied for the target positions $x1_T$, $x2_T$, $x_T$ and component R in the independent drive range B is, according to the determinant, the following equation (10).

$$\begin{pmatrix} x1_T \\ x2_T \end{pmatrix} = \begin{pmatrix} 1 & -1 \\ 0 & 1 \end{pmatrix} \begin{pmatrix} x_T \\ R \end{pmatrix} \tag{10}$$

Therefore, using the inverse matrix of this transformation matrix, in the independent drive range B, the following equation (11) is established for the measurement positions $x1_O$, $x2_O$, $x_O$, and component R as the relational equation of the inverse function.

$$\begin{pmatrix} x_O \\ R \end{pmatrix} = \begin{pmatrix} 0 & 1 \\ -1 & 1 \end{pmatrix} \begin{pmatrix} x1_O \\ x2_O \end{pmatrix} \tag{11}$$

In the present embodiment, the target position $x1_T$ is an example of a "first target position," and the target position $x2_T$ is an example of a "second target position".

In this manner, with the position adjustment apparatus 115 in the present embodiment, in each drive range, the target positions $x1_T$, $x2_T$ of the control circuits 144A, 144B, the measurement positions $x1_O$, $x2_O$ of the position sensors 142A, 142B, and the excess degree of freedom R satisfy the transformation equation from the equation (6) to the equation (11) via the coefficient of variation a. Note that the integrated circuits 140A, 140B are distinguished from each other by their controlling roles in their respective drive ranges and they do not have main or sub roles. Also, the electromagnetic actuator formed of each of the air-core coils 120A, 120B controlled by each of the control circuits 144A, 144B, and the magnet 220 are not distinguished by their main or sub roles, or the like either.

On the other hand, for a linear motor coil described in Patent Document 1, each coil is given its main and sub roles, so the roles cannot be switched at high speed when the drive direction is switched in a short period of time, which may result in poor responsiveness. The position adjustment apparatus 115 in the present embodiment does not distinguish between the integrated circuits 140A, 140B and between the electromagnetic actuators in terms of their roles, thereby enabling switching of control for each drive range to be performed at higher speed than in apparatus which distinguishes them in terms of their main and sub roles, or the like.

Next, referring again to FIG. 5, a method by which the control apparatus 170 of the position adjustment apparatus 115 performs the above-described control will be described. The control apparatus 170 outputs the target position information (A) and a target position information (B) to the control circuits 144A, 144B as target positions of the electromagnetic actuator, based on the position information (A) and the position information (B) of the movable member 210 from the position sensors 142A, 142B. The control apparatus 170 includes a position information acquisition unit 172, a target posture information acquisition unit 174, correction information derivation unit 175, a target position derivation unit 177, and an output unit 179.

The position information acquisition unit 172 acquires respective position information (A) and position information (B) indicating the position of the movable member 210 from each of the position sensors 142A, 142B. The positions of the movable member 210 indicated in each of the position information (A) and the position information (B) indicates the current position of a specific reference point (e.g., center of mass) of the movable member 210 as detected by each of the position sensors 142A, 142B. The measurement position of the movable member 210 indicated in the position information (A) is the measurement position $x1_O$, and the measurement position of the movable member 210 indicated in the position information (B) is the measurement position $x2_O$.

The target posture information acquisition unit 174 acquires a target posture information indicating the target posture with a degree of freedom component associated with the movement or the rotation of the movable member 210. In the present embodiment, a degree of freedom associated with the movement of the target posture information acquisition unit 174 is the X-direction and the target posture in the X-direction is the target position $x_T$.

The correction information derivation unit 175 derives the correction information indicating a corrective component for correcting the misalignments of the target position other than the degree of freedom associated with the movement or the rotation of the movable member 210, based on the position of the movable member 210 indicated in each of the position information (A) and the position information (B). In the present embodiment, the corrective component for correcting the misalignments of the target position other than the degree of freedom associated with the movement or the rotation of the movable member 210 is the excess degree of freedom component R. The correction information derivation unit 175 derives the excess degree of freedom component R to satisfy the equations (7), (9), (11) for each of the independent drive range A, the first overlapping range, and the independent drive range B, based on the measurement positions $x1_O$, $x2_O$.

The target position derivation unit 177 derives the target positions of the movable member 210 for the control circuits 144A, 144B based on the target posture information, the correction information, and the set of coefficients defined according to the position of the movable member 210 to be applied to the corrective component indicated in the correction information. In the present embodiment, the set of coefficients defined according to the position of the movable member 210 to be applied to the corrective component indicated in the correction information is the set of coefficients based on the coefficient of variation a. Therefore, in the present embodiment, the target position derivation unit 177 derives the target positions $x1_T$, $x2_T$, for the control circuits 144A, 144B based on the target position $x_T$, the correction information about the excess degree of freedom component R, and the coefficient of variation a.

The output unit 179 outputs the target position information indicating the target positions of the movable member 210 derived by the target position derivation unit 177 to each of the control circuits 144, to bring the movable member 210 into the target posture. In the present embodiment, the output unit 179 outputs the target position information (A), (B)

indicating the target positions $x1_T$, $x2_T$ to each of the control circuits 144A, 144B, to bring the movable member 210 into the target posture.

Figure 9:
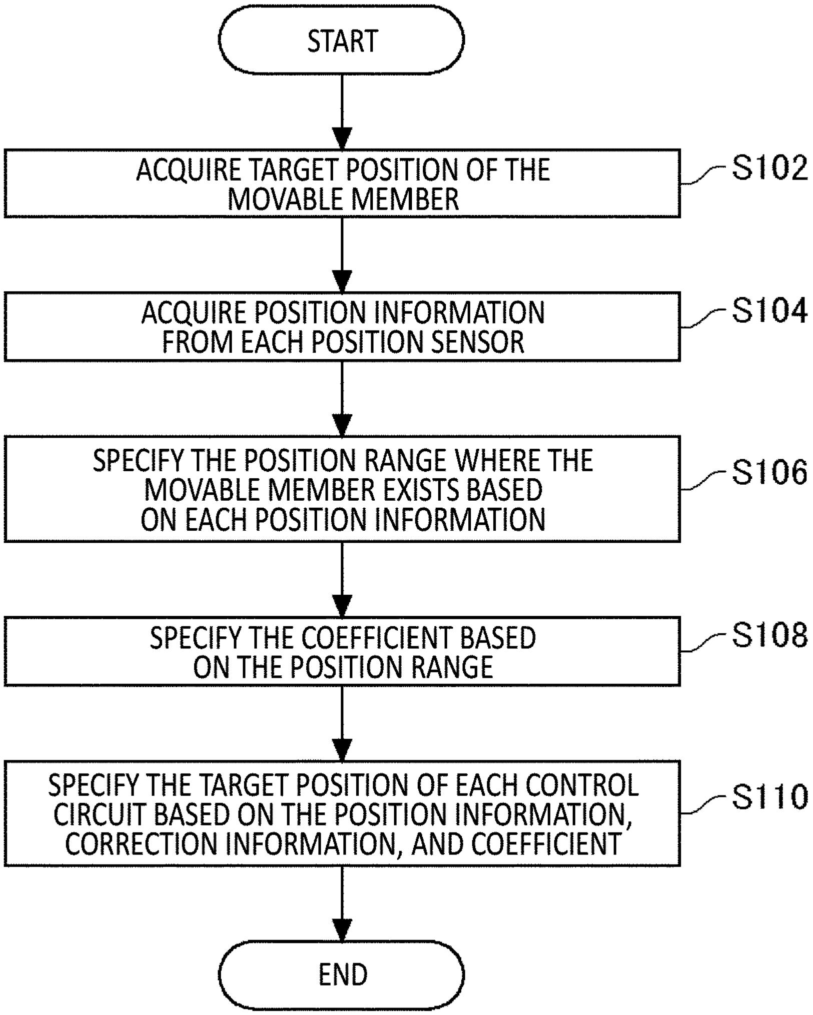
FIG. 9 shows a flow diagram of a method for controlling air-core coils 120A, 120B in the electromagnetic actuator.

FIG. 9 shows a flow diagram of the method for controlling the air-core coils 120A, 120B in the electromagnetic actuator using the control circuits 144A, 144B. The control method of the present embodiment comprises steps S102 to S110. The control method of the present embodiment is described with a focus on the control which is to be performed by the control apparatus 170 as a result of an introduction of the control which utilizes the coefficient of variation a in the first overlapping range particularly according to a position range of the movable member 210.

Each of the position sensors 142A, 142B of the integrated circuits 140A, 140B acquires the measurement positions $x1_O$, $x2_O$ of the movable member 210 (S102). Then, the control circuits 144A, 144B and the position information acquisition unit 172 acquire the position information A and the position information B from each of the position sensors 142A, 142B (S104).

Then, the position information acquisition unit 172 specifies the position range as to which drive range the movable member 210 is in from the position information A and the position information B (S106). First, in controlling the movable member 210, the position information acquisition unit 172 acquires the global position of the movable member 210 as to whether the movable member 210 is in the independent drive ranges A, B, or the first overlapping range.

For example, the position information acquisition unit 172 recognizes the drive range from the approximate value from the measurement position $x1_O$ to the measurement position $x2_O$. Alternatively, the position information acquisition unit 172 subtracts the measurement position $x2_O$ from the measurement position $x1_O$ and calculates an absolute value $|x1_O-x2_O|$ of a subtracted value. In this case, the position information acquisition unit 172 determines that the movable member 210 is in the first overlapping range if the absolute value $|x1_O-x2_O|$ is less than or equal to a predefined threshold.

For example, the position information acquisition unit 172 holds a table regarding the relationship in which the measurement position and the actual position are given for each of the integrated circuits 140A, 140B in the independent drive ranges A, B. In this case, based on this table, the position information acquisition unit 172 determines which independent drive ranges A, B, the movable member 210 is in. Based on this position range, a determination is made as to which of equation (6) to equation (11) is to be used by the correction information derivation unit 175 to derive the correction information.

Then, the position information acquisition unit 172 acquires a specific value of the measurement positions $x1_O$, $x2_O$ within this drive range, and the correction information derivation unit 175 uses the specific value of the measurement positions $x1_O$, $x2_O$ to derive the correction information.

Next, the correction information derivation unit 175 specifies the coefficient of variation a based on the range where the movable member 210 is located (S108). The coefficient of variation a takes a value of a=0 when the movable member 210 is in the independent drive range A, and takes a value of a=1 when the movable member 210 is in the independent drive range B. The correction information derivation unit 175 specifies the specific value of the coefficient a which is $0 \leq a \leq 1$, based on the measurement positions $x1_O$, $x2_O$ when the movable member 210 is in the first overlapping range.

Note that the target posture information acquisition unit 174 acquires the target position information based on the target position $x_T$ prior to S110 which follows. The timing at which the target posture information acquisition unit 174 acquires the target position information is not limited provided that it occurs prior to S110. The correction information derivation unit 175 derives the correction information including the transformation matrix for deriving the target positions $x1_T$, $x2_T$ from the target position $x_T$ and the excess degree of freedom component R, including the coefficient of variation a.

Further, the target position derivation unit 177 derives the target positions $x1_T$, $x2_T$ of the movable member 210 for the control circuits 144A, 144B based on the target posture information, the correction information, and the coefficient of variation a defined according to the position of the movable member 210 to be applied to the corrective component indicated in the correction information (S110). The integrated circuits 140A, 140B control the position of the movable member 210 based on the target positions $x1_T$, $x2_T$.

Figure 10:
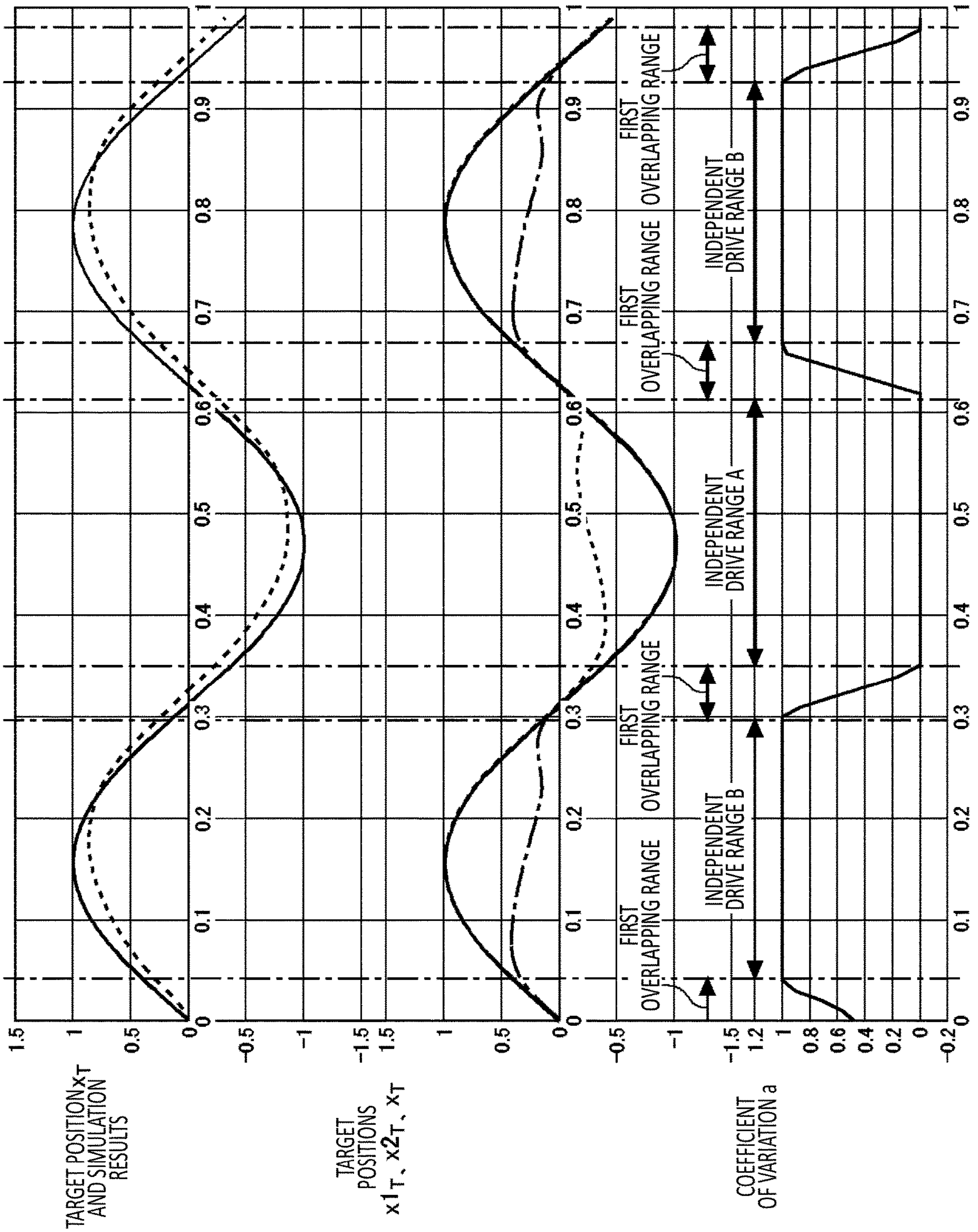
FIG. 10 shows a simulation result of a position at which the movable member 210 is controlled in the drive control of the integrated circuit 140 using the coefficient of variation a of the present embodiment.

FIG. 10 shows a simulation result of the position at which the movable member 210 is controlled in the drive control of the integrated circuit 140 using the coefficient of variation a of the present embodiment. The target positions $x_T$, $x1_T$, $x2_T$ and the coefficient of variation a in each of the independent drive ranges A, B and the first overlapping range are shown.

In the figure, first, a graph of the target position $x_T$ (a solid line) of the electromagnetic actuator and a simulation result position (a broken line) where the movable member 210 is positioned under the drive control is shown. Second, a graph of the target positions $x1_T$ (a dashed-dotted line) and $x2_T$ (a broken line) of the integrated circuits 140A, 140B, and the target position $x_T$ (a solid line) of the electromagnetic actuator is shown. Third, a graph of the coefficient of variation a according to the positions is shown.

The coefficient of variation a indicates a=0 in the independent drive range A, and indicates a=1 in the independent drive range B. Therefore, the range where the coefficient of variation a is 0 or 1 corresponds to the independent drive ranges A, B, and in this range, the target position $x1_T$ or $x2_T$ of either one of the integrated circuit 140A or the integrated circuit 140B accurately gives the target position $x_T$ of the electromagnetic actuator. In the independent drive range A, a curve of the target position $x_T$ shown with the solid line approximately overlaps a curve of the target position $x1_T$ of the integrated circuit 140A shown with the broken line. In the independent drive range B, the curve of the target position $x_T$ shown with the solid line approximately overlaps a curve of the target position $x2_T$ of the integrated circuit 140B shown with the broken line.

In the first overlapping range, a takes a value of $0 \leq a \leq 1$. The integrated circuits 140A, 140B control the position of the movable member 210 based on the equation (8). In the figure, as shown, the curve of the target position $x_T$ is smoothly connected without any skips occurring in the curve at the boundary of the independent drive range A and the first overlapping range, and at the boundary of the first overlapping range and the independent drive range B, respectively. This is because the coefficient of variation a varies continuously according to the positions with the value of $0 \leq a \leq 1$.

The simulation result of the position of the movable member 210 shown with the broken line follows the target position $x_T$ shown with the solid line. In addition, shapes of the curves in those graphs shown are similar. Thus, the control apparatus 170 can smoothly control the position of the movable member 210 so that it comes close to the target position $x_T$.

Figure 11:
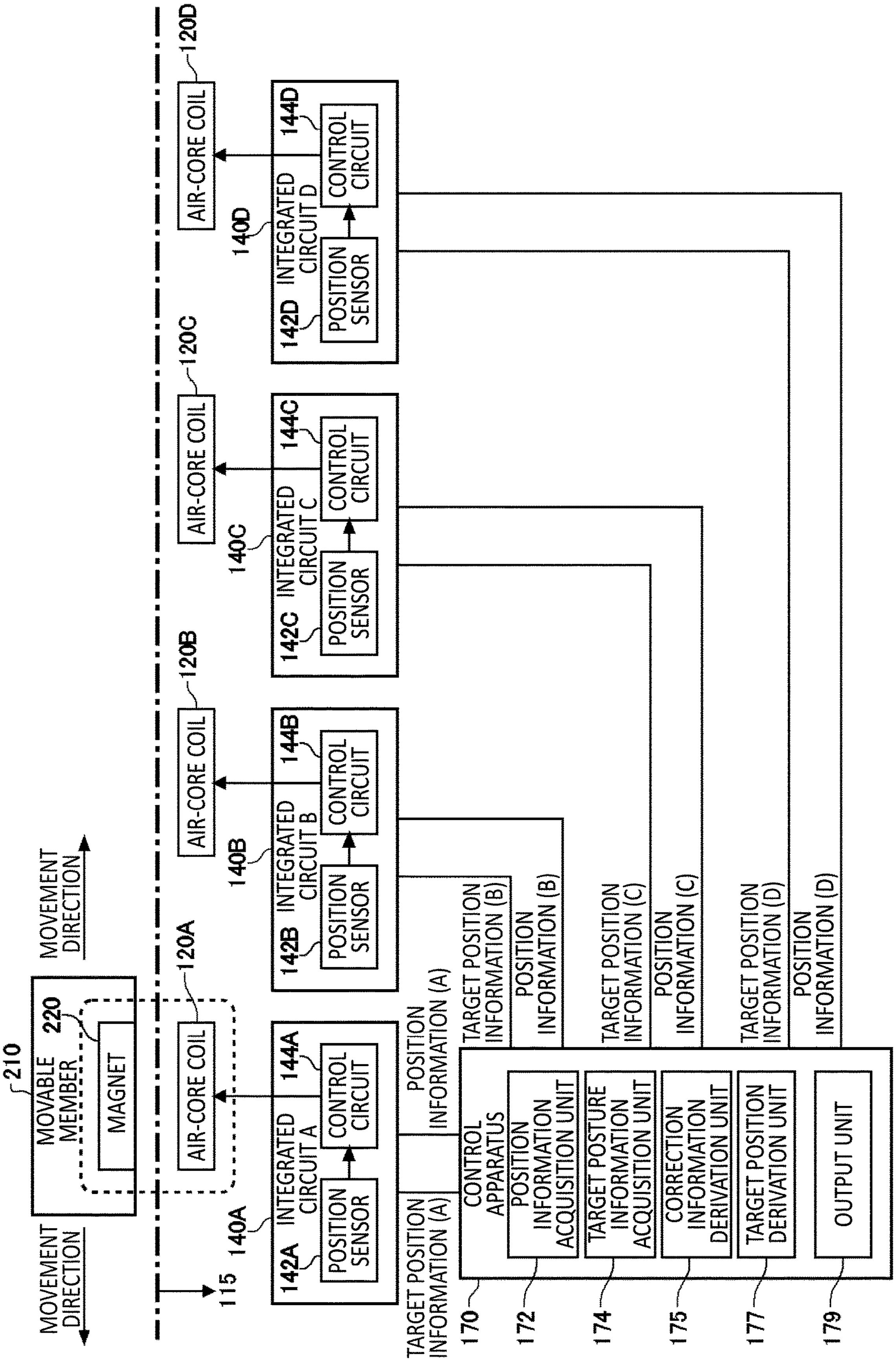
FIG. 11 shows an example of a configuration of the position adjustment apparatus 115 when four integrated circuits 140A, 140B, 140C, 140D are provided for a degree of freedom in one straight-ahead direction.

FIG. 11 shows an example of a configuration of the position adjustment apparatus 115 when the four integrated circuits 140A, 140B, 140C, 140D are provided for the degree of freedom in one straight-ahead direction. The following description focuses mainly on the differences compared to the embodiment in FIG. 5.

In comparison to the embodiment in FIG. 5, the position adjustment apparatus 115 includes integrated circuits 140C, 140D. An integrated circuit 140C includes the position sensor 142C and a control circuit 144C, and an integrated circuit 140D includes the position sensor 142D and a control circuit 144D. Here, the position sensor 142C is an example of a "third position sensor", and the control circuit 144C is an example of a "third control circuit". Further, the electromagnetic actuator formed of an air-core coil 120C and the magnet 220 is an example of a "third driving source". The position sensor 142D is an example of a "fourth position sensor", and the control circuit 144D is an example of a "fourth control circuit". Further, the electromagnetic actuator formed of an air-core coil 120D and the magnet 220 is an example of a "fourth driving source".

The position sensor 142C and the position sensor 142D detect the position of the movable member 210 and output a position information (C) and a position information (D). In this manner, the control apparatus 170 outputs four target position information (A), (B), (C), (D) for controlling the movable member 210, based on four position information (A), (B), (C), (D). As such, when the control is performed based on three or more position information, it may cause the overlapping range of the drive control by the two or more integrated circuits 140, or, a drive control range may be defined so that the drive control is constantly performed by the two or more integrated circuits 140 without performing an independent drive control in the drive control range (specific examples of this will be described later with reference to FIG. 14 and FIG. 15.)

In the following, specific examples of the drive ranges of the integrated circuits 140A-140D and the set of coefficients of variation in the drive ranges or the like when the position adjustment apparatus 115 includes the integrated circuits 140A-140D are shown with reference to FIG. 12-15. With this, examples of the drive control of the position adjustment apparatus 115 will be described.

Figure 12:
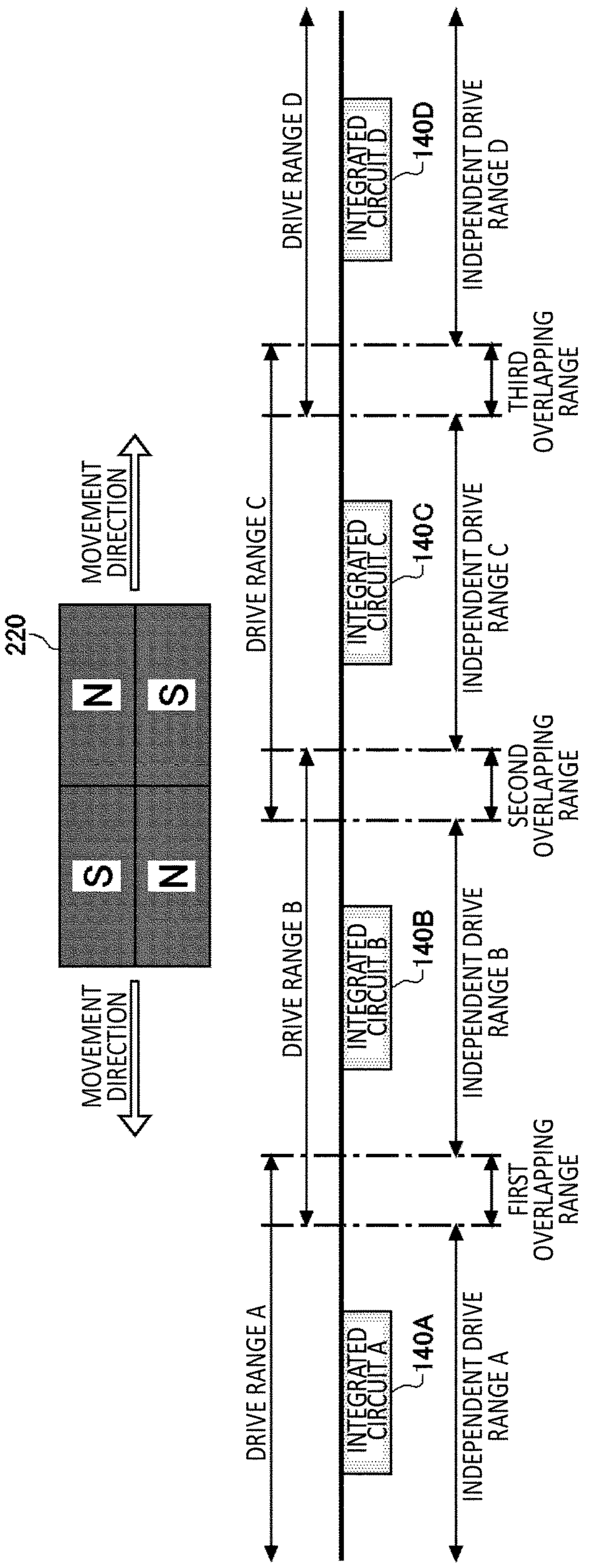
FIG. 12 shows an example of a schematic of the drive control, based on an arrangement of the magnet 220 and the integrated circuits 140A-140D.

FIG. 12 shows an example of a schematic of the drive control, based on the arrangement of the magnet 220 and the integrated circuits 140A-140D. The drive of the magnet 220 in the movable member 210 is controlled by the position adjustment apparatus 115 in FIG. 11.

In the present embodiment, the drive ranges A, B overlap in the first overlapping range, while the drive ranges A, C or the drive ranges A, D do not overlap. Also, the drive ranges B, C overlap in a second overlapping range, while the drive ranges B, D do not overlap. Moreover, the drive ranges C, D overlap in a third overlapping range. Thus, in the present embodiment, the drive range has the overlapping ranges with the adjacent drive ranges, but it does not have overlapping drive ranges with the non-adjacent drive ranges. Also, each of the drive ranges A, B, C, D has independent drive ranges A, B, C, D outside the first to the third overlapping ranges. The control in the embodiment in FIG. 12 is effective, for example, when the integrated circuits 140A-140D are controlled independent of each other. The drive range C is an example of a "third drive range".

Figure 13:
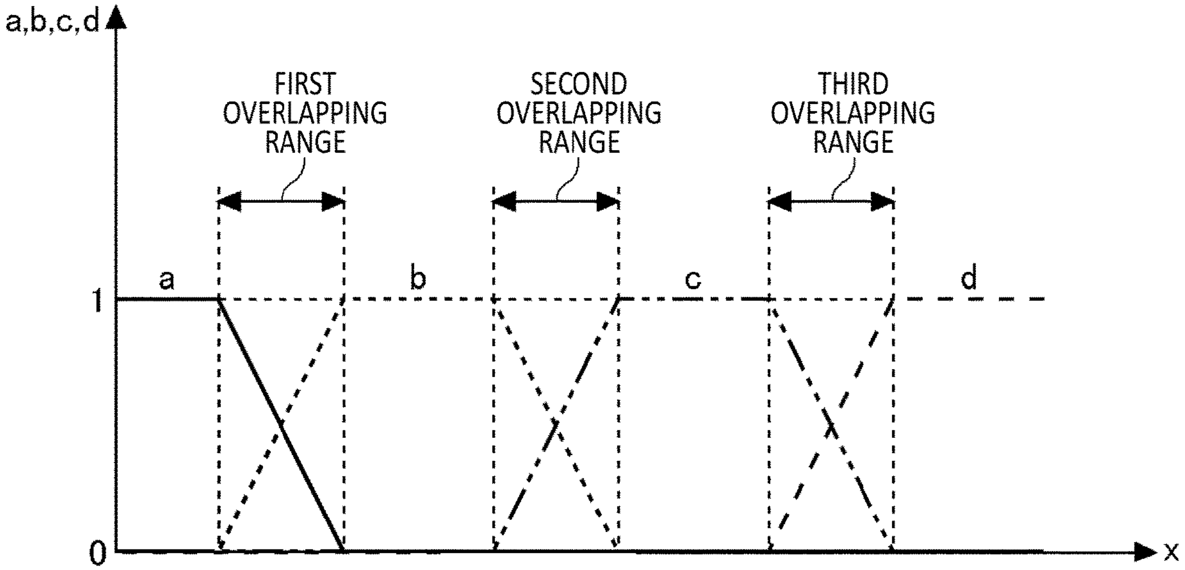
FIG. 13 shows an example of a set of coefficients which varies according to a position in each drive range in the drive control of FIG. 12.

FIG. 13 shows an example of the set of coefficients which varies according to the position in each drive range in the drive control of FIG. 12.

In the case of using the four integrated circuits 140A, 140B, 140C, 140D as in the present embodiment, the control apparatus 170 derives the target positions $x1_T$, $x2_T$, $x3_T$, $x4_T$ for each of the integrated circuits 140A, 140B, 140C, 140D. In order to derive the four target positions $x1_T$, $x2_T$, $x3_T$, $x4_T$, the control apparatus 170 introduces the three excess degrees of freedom components $R1_O$, $R2_O$, $R3_O$ as the excess degrees of freedom components other than the degree of freedom of the target position $x_T$ of the electromagnetic actuator. Further, the control apparatus 170 introduces four sets of coefficients a, b, c, d as the set of coefficients of variation which varies according to the position of x.

In the present embodiment, the transformation between the target position $x_T$ of the electromagnetic actuator and the excess degrees of freedom components $R1_O$, $R2_O$, $R3_O$, and the target positions $x1_T$, $x2_T$, $x3_T$, $x4_T$ of the integrated circuits 140A, 140B, 140C, 140D can be given by the following equation (12).

$$\begin{pmatrix} x1_T \\ x2_T \\ x3_T \\ x4_T \end{pmatrix} = \begin{bmatrix} 1 & 2(b+d) & 2(c+d) & 2(b+c) \\ 1 & -2(a+c) & 2(c+d) & -2(a+d) \\ 1 & 2(b+d) & -2(a+b) & -2(a+d) \\ 1 & -2(a+c) & -2(a+b) & 2(b+c) \end{bmatrix} \begin{pmatrix} x_T \\ R1_O \\ R2_O \\ R3_O \end{pmatrix} \tag{12}$$

Here, the coefficients of variation a, b, c, d satisfy a+b+c+d=1 and a, b, c, d≥0. In the present embodiment, the target position $x3_T$ is an example of a "third target position".

In the present embodiment, as shown in the figure, the coefficients of variation a, b, c, d indicate a value of 1 in each independent drive range of the corresponding integrated circuits 140A, 140B, 140C, 140D. In addition, the coefficients of variation a, b, c, d vary between 0≤a, b, c, d≤1 in the overlapping drive ranges with the adjacent integrated circuits 140A, 140B, 140C, 140D, and indicate a value of 0 in the independent drive ranges of other integrated circuits 140A, 140B, 140C, 140D.

As the relational equation of this inverse function, the transformation between the measurement positions $x1_O$, $x2_O$, $x3_O$, $x4_O$ of the integrated circuits 140A, 140B, 140C, 140D and the measurement position $x_O$ of the electromagnetic actuator and the excess degrees of freedom components $R1_O$, $R2_O$, $R3_O$ is given by the following equation (13).

$$\begin{pmatrix} x_O \\ R1_O \\ R2_O \\ R3_O \end{pmatrix} = \begin{bmatrix} a & b & c & d \\ 1/4 & -1/4 & 1/4 & -1/4 \\ 1/4 & 1/4 & -1/4 & -1/4 \\ 1/4 & -1/4 & -1/4 & 1/4 \end{bmatrix} \begin{pmatrix} x1_O \\ x2_O \\ x3_O \\ x4_O \end{pmatrix} \tag{13}$$

In this manner, the control apparatus 170 can derive the excess degrees of freedom components $R1_O$, $R2_O$, $R3_O$ from the measurement positions $x1_O$, $x2_O$, $x3_O$, $x4_O$ measured by the position sensors 142A, 142B, 142C, 142D.

In the present embodiment, when the target posture information acquisition unit 174 acquire the target posture information, the position information acquisition unit 172 acquires the position information (C) indicating a measurement position $x3_O$ detected by the position sensor 142C which is utilized to control the electromagnetic actuator with the air-core coil 120C and the magnet 220. Similarly, the position information acquisition unit 172 acquires the position information (D) indicating a measurement position $x4_O$ detected by the position sensor 142D. The target position derivation unit 177 derives the target positions $x1_T$, $x2_T$, $x3_T$, $x4_T$ based on the transformation matrix in the equation (12) and the set of coefficients in the equation (12) according to the position of the movable member 210 based on at least one of the measurement positions $x1_O$, $x2_O$, $x3_O$, $x4_O$.

For example, in the equation (12), it is assumed that a=1 and b=c=d=0. When the movable member 210 is located outside the first overlapping range within the drive range A, i.e., in the independent drive range A, as the movable member 210 approaches the target position $x_T$ which is equal to the target position $x1_T$, the target position $x1_T$ approaches the measurement position $x1_O$. In this case, the target position $x2_T$ also approaches the measurement position $x2_O$, the target position $x3_T$ also approaches the measurement position $x3_O$, and the target position $x4_T$ also approaches the measurement position $x4_O$. The set of coefficients of the target positions $x1_T$, $x2_T$, $x3_T$, $x4_T$ in the equation (12) which satisfies this condition is an example of the "first set of coefficients".

For example, in the equation (12), it is assumed that b=1 and a=c=d=0. When the movable member 210 is located outside the first overlapping range and outside the second overlapping range within the drive range B, i.e., in the independent drive range B, as the movable member 210 approaches the target position $x_T$ which is equal to the target position $x2_T$, the target position $x2_T$ approaches the measurement position $x2_O$. In this case, the target position $x1_T$ also approaches the measurement position $x1_O$, the target position $x3_T$ also approaches the measurement position $x3_O$, and the target position $x4_T$ also approaches the measurement position $x4_O$. The set of coefficients of the target positions $x1_T$, $x2_T$, $x3_T$, $x4_T$ in the equation (12) which satisfies this condition is an example of the "second set of coefficients".

For example, in the equation (12), it is assumed that c=1 and a=b=d=0. When the movable member 210 is located outside the second overlapping range within the drive range C, i.e., in the independent drive range C, as the movable member 210 approaches the target position $x_T$ which is equal to the target position $x3_T$, the target position $x3_T$ approaches the measurement position $x3_O$. In this case, the target position $x1_T$ also approaches the measurement position $x1_O$, the target position $x2_T$ also approaches the measurement position $x2_O$, and the target position $x4_T$ also approaches the measurement position $x4_O$. The set of coefficients of the target positions $x1_T$, $x2_T$, $x3_T$, $x4_T$ in the equation (12) which satisfies this condition is an example of the "third set of coefficients".

When the movable member 210 is located within the first overlapping range or within the second overlapping range, based on the measurement position $x1_O$ which is based on the position information (A) and the measurement position $x2_O$ which is based on the position information (B), and the measurement position $x3_O$ which is based on the position information (C), the correction information is derived using the set of coefficients of variation according to the predefined function which is based on the coefficients a, b, c, d. When the movable member 210 exists at the boundary position between the independent drive range A and the first overlapping range, the set of coefficients of variation for the target positions $x1_T$, $x2_T$, $x3_T$, $x4_T$ is the same as the first set of coefficients. When the movable member 210 exists at the boundary position between the independent drive range B and the first overlapping range or the second overlapping range, the set of coefficients of variation for the target positions $x1_T$, $x2_T$, $x3_T$, $x4_T$ is the same as the second set of coefficients. When the movable member 210 exists at the boundary position between the independent drive range C and the second overlapping range, the set of coefficients of variation for the target positions $x1_T$, $x2_T$, $x3_T$, $x4_T$ is the same as the third set of coefficients.

In this manner, the position adjustment apparatus 115 of the present embodiment introduces a plurality of the excess degrees of freedom components and a plurality of the coefficients the values of which vary according to the position. The position adjustment apparatus 115 continuously varies the values so that a plurality of the coefficients of variation is predefined coefficients at the boundary of the drive range. In this manner, the position adjustment apparatus 115 can smoothly vary the target position $x_T$ of the movable member 210, accurately control the position of the movable member 210, and also reduce electrical power consumption of the electromagnetic actuator.

Figure 14:
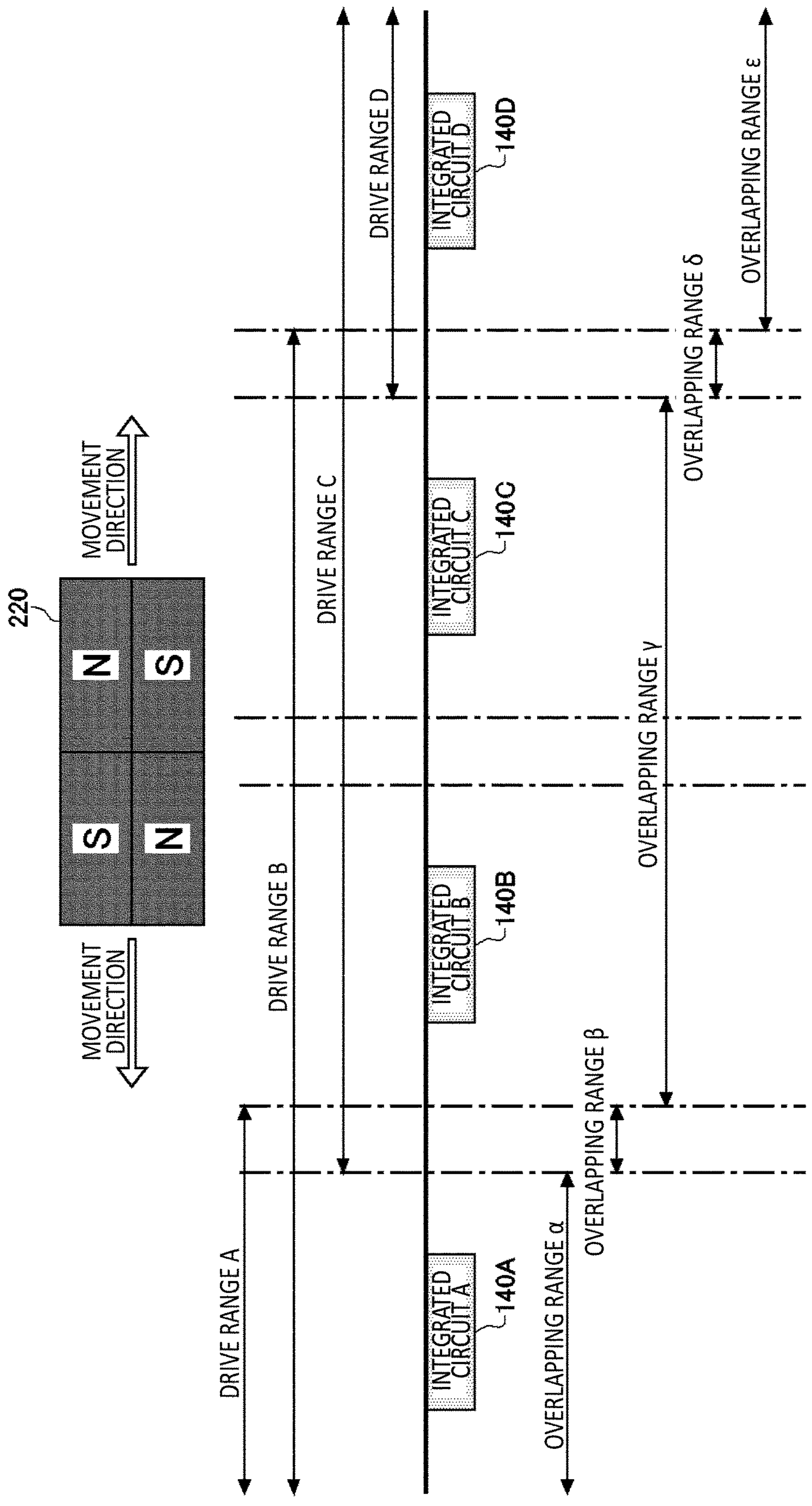
FIG. 14 shows another example of a schematic of the drive control, based on the arrangement of the magnet 220 and the integrated circuits 140A-140D.

FIG. 14 shows another example of a schematic of the drive control, based on the arrangement of the magnet 220 and the integrated circuits 140A-140D.

In the present embodiment, the independent drive ranges A, B, C, D for the integrated circuits 140A-140D are not provided, and two or more of the integrated circuits 140 control the drive of the movable member 210 over the entire drive range of the integrated circuits 140A-140D. Among the ranges where the drive ranges A, B overlap, the range which does not overlap with the drive range C corresponds to an overlapping range α. The range where the drive ranges A, B, C overlap corresponds to an overlapping range β. Among the ranges where the drive ranges B, C overlap, the range which does not overlap with the drive range A or a drive range D corresponds to an overlapping range γ. The range where the drive ranges B, C, D overlap corresponds to an overlapping range δ. Among the ranges where the drive ranges C, D overlap, the range which that does not overlap with the drive range B corresponds to an overlapping range E. The overlapping ranges α, β, γ, δ, and ε do not overlap with each other. In the case where two or more of the integrated circuits 140 control the drive of the movable member 210 over the entire drive range, the overlapping range α is an example of the "first overlapping range", and the overlapping range β is an example of the "second overlapping range", and the overlapping range γ is an example of the "third overlapping range."

The control of the drive of the movable member 210 by the integrated circuit 140 of the present embodiment has the drive ranges controlled by the two integrated circuits 140 and the ranges where these drive ranges overlap with each other, as shown in the figure. This control precisely controls the movable member 210 when, for example, distances between the integrated circuits 140A-140D being arranged with each other are shorter than those shown in the examples in FIG. 12 and FIG. 13.

Figure 15:
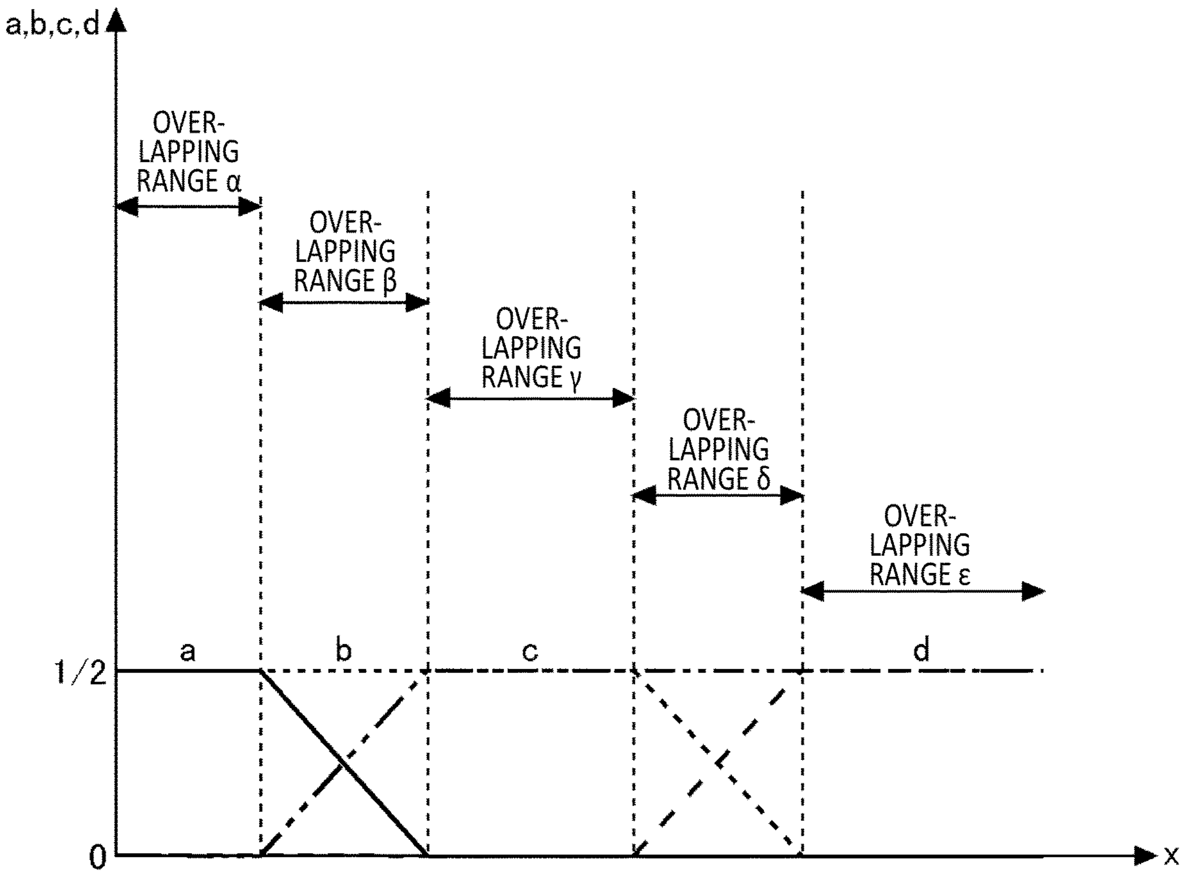
FIG. 15 shows an example of the set of coefficients which varies according to a position in each drive range in the drive control of FIG. 14.

FIG. 15 shows an example of the set of coefficients which varies according to the position in each drive range in the drive control of FIG. 14. The specific transformation equation in this case is the same as the equation (12) and the equation (13). Note that the values taken by a, b, c, d are the values shown in the figure. Even in the case of the drive control with the drive ranges controlled by two integrated circuits 140 and the range where those drives ranges overlap as in the present embodiment, the coefficients of variation a, b, c, d vary so as to satisfy a+b+c+d=1, 0≤a, b, c, d≤1.

In the step of acquiring the position information acquisition unit 172, the position information (A), (B), (C), (D) are acquired. The target position derivation unit 177 derives the target positions $x1_T$, $x2_T$, $x3_T$, $x4_T$ based on the target posture indicating the target position $x_T$, the corrective component derived by the correction information derivation unit 175, and the set of coefficients according to the position of the movable member which is based on the set of coefficients according to the position of the movable member 210 which is based on at least one of the position information (A), (B), (C), (D).

For example, in the equation (12), it is assumed that a=b=½ and c=d=0. When the movable member 210 is located within the overlapping range α, as the movable member 210 approaches the target position $x_T$ which is equal to $(x1_T+x2_T)/2$, the target position $x1_T$ approaches the measurement position $x1_O$ and the target position $x2_T$ approaches the measurement position $x2_O$. In this case, the target position $x3_T$ also approaches the measurement position $x3_O$, and the target position $x4_T$ also approaches the measurement position $x4_O$. The set of coefficients of the target positions $x1_T$, $x2_T$, $x3_T$, $x4_T$ in the equation (12) which satisfies this condition is an example of the "first set of coefficients".

For example, in the equation (12), it is assumed that b=c=½ and a=d=0. When the movable member 210 is located within the overlapping range γ, as the movable member 210 approaches the target position $x_T$ which is equal to $(x2_T+x3_T)/2$, the target position $x2_T$ approaches the measurement position $x2_O$ and the target position $x3_T$ approaches the measurement position $x3_O$. In this case, the target position $x1_T$ approaches the measurement position $x1_O$, and the target position $x4_T$ approaches the measurement position $x4_O$. The set of coefficients of the target positions $x1_T$, $x2_T$, $x3_T$, $x4_T$ in the equation (12) which satisfies this condition is an example of the "second set of coefficients".

When the movable member 210 is located within the overlapping range β, b=½ and d=0 in the equation (12), however, a and c vary according to the position of the movable member 210. Therefore, in this range, the correction information is derived based on the measurement position $x1_O$ which is based on the position information (A) and the measurement position $x2_O$ which is based on the position information (B), and the measurement position $x3_O$ which is based on the position information (C), using the set of coefficients of variation according to the predefined function which is based on the coefficients a and c. When the movable member 210 exists at the boundary position between the overlapping range α and the overlapping range β, the set of coefficients of variation for the target positions $x1_T$, $x2_T$, $x3_T$, $x4_T$ is the same as the first set of coefficients. When the movable member 210 exists at the boundary position between the overlapping range β and the overlapping range γ, the set of coefficients of variation for the target positions $x1_T$, $x2_T$, $x3_T$, $x4_T$ is the same as the second set of coefficients.

In the above, the method by which the target positions $x1_T$, $x2_T$, $x3_T$, $x4_T$ for each integrated circuits 140A-140D can be derived when a plurality of the integrated circuits 140A-140D is introduced regarding the degrees of freedom of straight ahead movement or other translational movements toward a certain direction within an XYZ coordinate system was described. Next, again with reference to FIG. 3-FIG. 4D, regarding the rotational degree of freedom in the XYZ coordinate system, cases in which there is a range where the electromagnetic actuators 150A, 150B perform the independent drive control according to the relative position of the electromagnetic actuators 150A, 150B for the movable member 110 will be described.

In the examples already described in FIG. 4A-FIG. 4D, all of the electromagnetic actuators 150A-150D of the movable member 110 were turned on throughout the entire drive range. Similar to the examples described with reference to FIG. 5-FIG. 15, according to the relative position of the electromagnetic actuators 150A, 150B for the movable member 110, there are cases where a target position XY of the movable member can be controlled more precisely by using the target position of either the electromagnetic actuators 150A or 150B. That is, the drive range of the electromagnetic actuators 150A, 150B is controlled by dividing it into three separate ranges: the range where the target positions of the electromagnetic actuators 150 can be accurately represented by the target position of the electromagnetic actuator 150A alone, the range where the drive control of the electromagnetic actuators 150A, 150B overlap, and the range where the target positions of the electromagnetic actuators 150 can be accurately represented by the target position of the electromagnetic actuator 150B alone. In each of these drive ranges, the target positions $x1_T$, $x2_T$, $y1_T$, $y2_T$ of the electromagnetic actuators 150A, 150B, 150C, 150D are derived.

First, consider the case where the rotational component θ is independent of the measurement positions $x1_O$, $x2_O$, $y1_O$, $y2_O$. In the range where the target positions of the electromagnetic actuators 150 can be accurately represented by the target position of the electromagnetic actuator 150A alone, the transformation between the target positions $x1_T$, $x2_T$, $y1_T$, $y2_T$, variables X, Y, the rotational component θ, and the excess degree of freedom component R is given by the following equation (14).

$$\begin{pmatrix} x1_T \\ x2_T \\ x3_T \\ x4_T \end{pmatrix} = \begin{pmatrix} 1 & 0 & 0 & 0 \\ 1 & 0 & 2 & 2 \\ 0 & 1 & -1 & 0 \\ 0 & 1 & 1 & 0 \end{pmatrix} \begin{pmatrix} X \\ Y \\ \theta \\ R \end{pmatrix} \tag{14}$$

The inverse function for the measurement positions $x1_O$, $x2_O$, $y1_O$, $y2_O$ of the position sensors 142A, 142B, 142C, 142D to derive the excess degree of freedom R is given by the following equation (15).

$$\begin{pmatrix} X \\ Y \\ \theta \\ R \end{pmatrix} = \begin{pmatrix} 1 & 0 & 0 & 0 \\ 0 & 0 & 1/2 & 1/2 \\ 0 & 0 & -1/2 & 1/2 \\ -1/2 & 1/2 & 1/2 & -1/2 \end{pmatrix} \begin{pmatrix} x1_O \\ x2_O \\ y1_O \\ y2_O \end{pmatrix} \tag{15}$$

In the range where the drive control of the electromagnetic actuators 150A, 150B overlap, the transformation equation between the target positions $x1_T$, $x2_T$, $y1_T$, $y2_T$, the variables X, Y, the rotational component θ, and the excess degree of freedom component R is given by the following equation (16), using the coefficient a which varies according to the position.

$$\begin{pmatrix} x1_T \\ x2_T \\ x3_T \\ x4_T \end{pmatrix} = \begin{pmatrix} 1 & 0 & -2a & -2a \\ 1 & 0 & 2(1-a) & 2(1-a) \\ 0 & 1 & -1 & 0 \\ 0 & 1 & 1 & 0 \end{pmatrix} \begin{pmatrix} X \\ Y \\ \theta \\ R \end{pmatrix} \tag{16}$$

Here, a is a real number which satisfies 0≤a≤1. The inverse function for the measurement positions $x1_O$, $x2_O$, $y1_O$, $y2_O$ to derive the excess degree of freedom R is given by the following equation (17).

$$\begin{pmatrix} X \\ Y \\ \theta \\ R \end{pmatrix} = \begin{pmatrix} 1-a & a & 0 & 0 \\ 0 & 0 & 1/2 & 1/2 \\ 0 & 0 & -1/2 & 1/2 \\ -1/2 & 1/2 & 1/2 & -1/2 \end{pmatrix} \begin{pmatrix} x1_O \\ x2_O \\ y1_O \\ y2_O \end{pmatrix} \tag{17}$$

The above equation is satisfied.

Further, in the range where the target positions of the electromagnetic actuators 150 can be accurately represented by the target position of the electromagnetic actuator 150B alone, the transformation equation between the target positions $x1_T$, $x2_T$, $y1_T$, $y2_T$, the variables X, Y, the rotational component θ, and the excess degree of freedom component R is given by the following equation (18).

$$\begin{pmatrix} x1_T \\ x2_T \\ x3_T \\ x4_T \end{pmatrix} = \begin{pmatrix} 1 & 0 & -2 & -2 \\ 1 & 0 & 0 & 0 \\ 0 & 1 & -1 & 0 \\ 0 & 1 & 1 & 0 \end{pmatrix} \begin{pmatrix} X \\ Y \\ \theta \\ R \end{pmatrix} \tag{18}$$

The above equation is satisfied. The inverse function for the measurement positions $x1_O$, $x2_O$, $y1_O$, $y2_O$ to derive the excess degree of freedom R is given by the following equation (19).

$$\begin{pmatrix} X \\ Y \\ \theta \\ R \end{pmatrix} = \begin{pmatrix} 0 & 1 & 0 & 0 \\ 0 & 0 & 1/2 & 1/2 \\ 0 & 0 & -1/2 & 1/2 \\ -1/2 & 1/2 & 1/2 & -1/2 \end{pmatrix} \begin{pmatrix} x1_O \\ x2_O \\ y1_O \\ y2_O \end{pmatrix} \tag{19}$$

In the above equation, when a=0, the equations (16), (17) in the overlapping range of the drive control of the electromagnetic actuators 150A, 150B is consistent with the equations (14), (15) of the range where the target positions of the electromagnetic actuators 150 can be accurately represented by the target position of the electromagnetic actuator 150A alone. Similarly, when a=1, the equations (16), (17) in the overlapping range of the drive control of the electromagnetic actuators 150A, 150B is consistent with the equations (18), (19) of the range where the target positions of the electromagnetic actuators 150 can be accurately represented by the target position of the electromagnetic actuator 150B alone.

In this manner, the control which introduces the coefficient of variation a in the control of the electromagnetic actuators 150A, 150B can also be introduced in the rotational degree of freedom. According to the present embodiment, the image capturing apparatus 100 controls the electromagnetic actuators 150A, 150B with a single algorithm, and is also able to avoid control deviations in the drive range of the electromagnetic actuators 150A, 150B.

Second, consider the case where the measurement positions $x1_O$, $x2_O$ are used to derive the rotational component θ. The transformation equation and the inverse function equation in the range (a=0) where the target positions of the electromagnetic actuators 150 can be accurately represented by the target position of the electromagnetic actuator 150A alone are the same as the equation in the case where the rotational component θ is independent of the measurement positions $x1_O$, $x2_O$, $x3_O$, $x4_O$. Similarly, the transformation equation and the inverse function equation in the range (a=1) where the target positions of the electromagnetic actuators 150 can be accurately represented by the target position of the electromagnetic actuator 150B alone are also the same as the equation in the case where the rotational component θ is independent of the measurement positions $x1_O$, $x2_O$, $x3_O$, $x4_O$.

The transformation equation in the overlapping range of the drive control of the electromagnetic actuators 150A, 150B is given by the following equation (20) using a function f (a) where f(a=0)=0, f(a=½)=½, f(a=1)=0.

$$\begin{pmatrix} x1_T \\ x2_T \\ x3_T \\ x4_T \end{pmatrix} = \begin{pmatrix} 1 & 0 & -\frac{2a}{2f(a)+1} & -\frac{2a}{2f(a)+1} \\ 1 & 0 & \frac{2(1-a)}{2f(a)+1} & \frac{2(1-a)}{2f(a)+1} \\ 0 & 1 & -\frac{1}{2f(a)+1} & \frac{2f(a)}{2f(a)+1} \\ 0 & 1 & \frac{1}{2f(a)+1} & -\frac{2f(a)}{2f(a)+1} \end{pmatrix} \begin{pmatrix} X \\ Y \\ \theta \\ R \end{pmatrix} \tag{20}$$

The function f (a) may be a predefined function. The inverse function equation for the measurement positions $x1_O$, $x2_O$, $y1_O$, $y2_O$ satisfies the following equation (21).

$$\begin{pmatrix} X \\ Y \\ \theta \\ R \end{pmatrix} = \begin{pmatrix} 1-a & a & 0 & 0 \\ 0 & 0 & 1/2 & 1/2 \\ -f(a) & f(a) & -1/2 & 1/2 \\ -1/2 & 1/2 & 1/2 & -1/2 \end{pmatrix} \begin{pmatrix} x1_O \\ x2_O \\ y1_O \\ y2_O \end{pmatrix} \tag{21}$$

A specific example of the function f (a) where f(a=0)=0, f(a=½)=½, f(a=1)=0 includes the following equation (22).

$$f(a) = -2\left(a - \frac{1}{2}\right)^2 + \frac{1}{2} \tag{22}$$

In any of these cases, the variables X, Y and the rotational component θ are smoothly connected in a boundary region where a=0 and a=1. In this manner, the image capturing apparatus 100 can accurately control the position of the movable member 210 and also reduce the electrical power consumption of the electromagnetic actuator.

Next, with reference to FIG. 5, regarding the movement of the movable member 210, the method by which the control apparatus 170 performs the control when the above rotational degree of freedom and the degrees of freedom of straight ahead movement or other translational movements are mixed will be described. Here, a case where a sum total of a number of the degree of freedom of the rotational degree of freedom and the degree of freedom of straight ahead movement or other translational movements is m (m is a positive integer) will be described.

Further, consider the case where m+n integrated circuits 140 are provided (n is a positive integer), and thus m+n electromagnetic actuators are also formed. M+n position sensors 142 of the integrated circuits 140 transmit m+n measurement position information about the movable member 210 to the control apparatus 170.

The control apparatus 170 derives m+n target position information about the target posture of movable member 210 as follows. First, the position information acquisition unit 172 acquires m+n position information. In this manner, the position information acquisition unit 172 identifies which of each drive range the movable member 210 is in.

Next, the target posture information acquisition unit 174 acquires the target posture information indicating the target posture of the movable member 210 with m real degrees of freedom components. Since the m+n target position information may not be determined from the m real degrees of freedom components alone, the control apparatus 170 performs the following processes in order to determine the m+n target position information.

Next, the correction information derivation unit 175 introduces n excess degrees of freedom for the target posture which has m degrees of freedom, to determine the corrective component for the n excess degrees of freedom. Specifically, for a column vector describing the m real degrees of freedom components defined by the target posture information and each excess degree of freedom component, the inverse matrix equation of the transformation matrix for the identified drive range is multiplied by the column vector of the m+n measurement positions obtained from the m+n position information. In this manner, n excess degrees of freedom components are derived. Therefore, the corrective component includes a corrective component for each of the n degrees of freedom components.

In this manner, the correction information derivation unit 175 may, according to a predefined algorithm where at least one of m+n values corresponding to m+n positions of the movable member indicated in the respective position information is a variable, derive the correction information indicating the corrective component for correcting the misalignments of m+n target positions of the movable member 210 for the m+n integrated circuits 140 due to at least one of the n degrees of freedom components other than the m degrees of freedom associated with the movement or the rotation of the movable member. The correction information derivation unit 175 may, according to a predefined (m+n)×(m+n) matrix where m+n values corresponding to a position of a reference point of the movable member indicated in the respective position information are the variables, derive the correction information indicating the corrective component for correcting the misalignments of the m+n target positions of the movable member due to n degrees of freedom other than the m degrees of freedom associated with the movement or the rotation of the movable member.

Alternatively, the correction information derivation unit 175 may, according to a predefined m×(m+n) matrix, derive m degrees of freedom components associated with the movement or the rotation of the movable member, and according to a predefined (m+n)×m matrix which corresponds to the inverse transformation of the predefined m×(m+n) matrix, obtain m+n variables. In this manner, the correction information derivation unit 175 may derive the correction information by deriving the difference between those m+n variables and the position detected by the original m+n position sensors 142.

Next, the target position derivation unit 177 derives the m+n target positions of the movable member 210 for m+n control circuits 144. The target position derivation unit 177 derives the m+n target position information for each of the m+n target positions of m+n reference points of the movable member 210 based on the m real degrees of freedom and the n excess degrees of freedom components derived by the correction information derivation unit 175, using the (m+n)×(m+n) matrix in each drive range.

Here, consider the case where m target positions can be accurately represented by the drive by s control circuits 144 in the drive range of the m+n control circuits 144. Here, the s control circuits 144 move or rotate the movable member 210 by supplying current to s air-core coils 120 (driving source) in a specific drive range. Then, m+n−s control circuits 144 move or rotate the movable member 210 by supplying current to at least m+n−s air-core coils 120 in other drive ranges outside the specific drive range. When s=1, this corresponds to the independent drive ranges in the examples of FIG. 5-FIG. 10. When the movable member 210 is located within the specific drive range, the target position derivation unit 177 would use the set of coefficients of variation which would derive s target positions of the movable member 210 for the s control circuits 144 without being based on the position information indicating m+n−s measurement positions of the movable member 210 measured by m+n−s position sensors 142 utilized by the m+n−s control circuits 144 to control the respective driving sources.

The output unit 179 outputs the respective target position information indicating the respective target positions to each of the m+n control circuits 144. In this manner, each of the m+n control circuits 144 controls the m+n electromagnetic actuators based on the target position information. At this time, each of the m+n control circuits 144 may independently control each of the m+n electromagnetic actuators by the PID control which is based on the respective target positions.

Here, the embodiments in FIG. 5-FIG. 15 are examples of the movement with the degree of freedom in one direction denoted by x, where m is 1 and n is an integer of 1 or higher. In this embodiment, by driving of m+n driving sources, the movable member 210 moves along the X-direction.

For example, the embodiments of the rotation in FIG. 1-FIG. 4D can be combined with the embodiments in FIG. 5-FIG. 15. This corresponds to an example where m is 3 and n is an integer of 1 or higher. In this embodiment, as an example, the driving of the m+n driving sources enables the movable member to move within the XY plane and rotate with the Z axis as the rotational axis within the XY plane. As another example, for example, the movable member 210 can be made to move along the Z axis and rotate about the X axis and about the Y axis.

As described above, the control by the control apparatus 170 of the present embodiment can be performed also in the case of the m+n integrated circuits 140. In this manner, the control apparatus 170 can accurately control the position of the movable member 210 and also reduce the electrical power consumption of the electromagnetic actuator. Next, with reference to FIG. 16, an example configuration of the image capturing apparatus 100 including the control apparatus 170 will be described.

Figure 16:
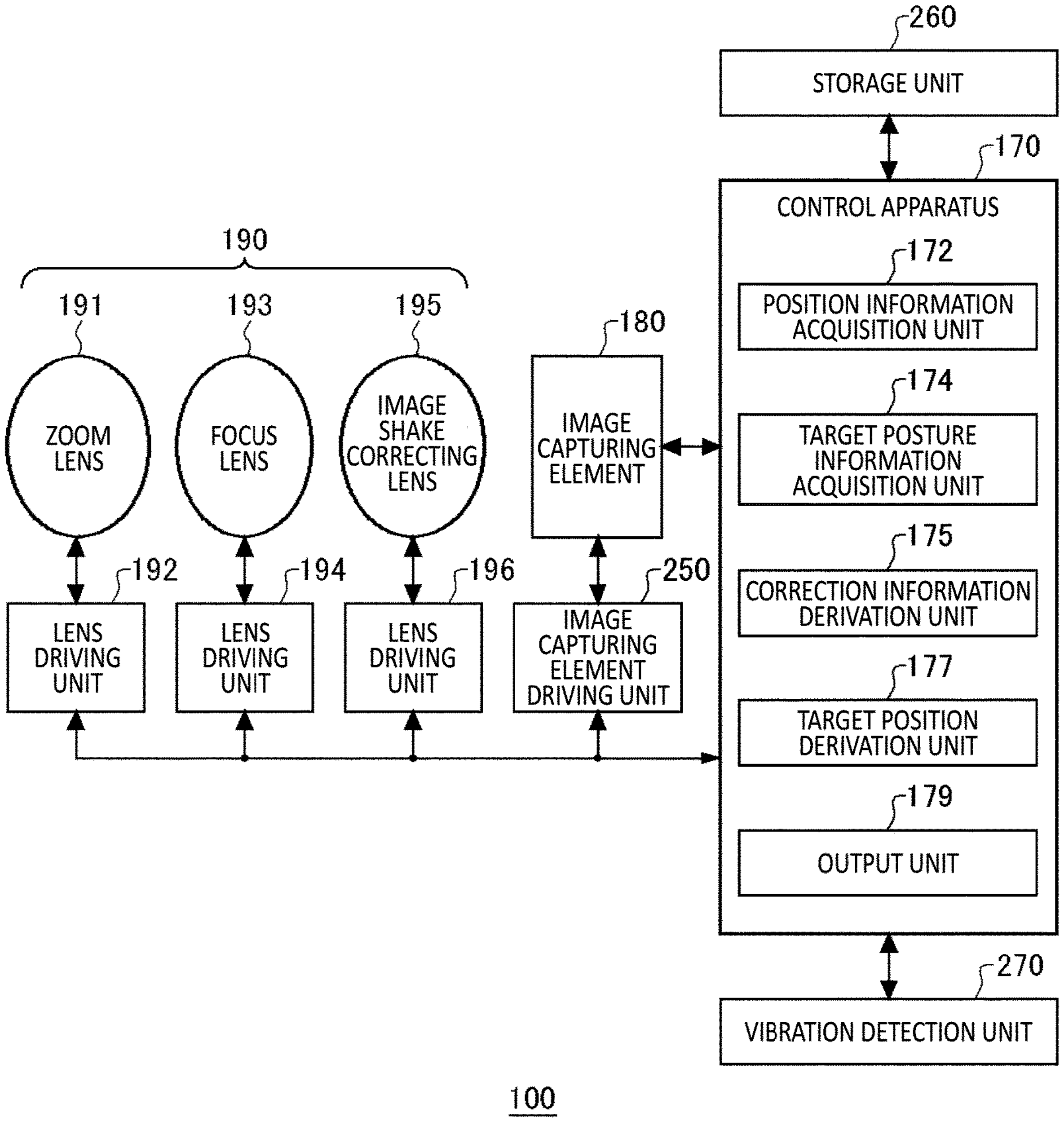
FIG. 16 shows an example of functional blocks of the image capturing apparatus 100.

FIG. 16 shows an example of functional blocks of the image capturing apparatus 100. The image capturing apparatus 100 comprises the control apparatus 170, an image capturing element 180, an image capturing element driving unit 250, an optical system 190, a lens driving unit 192, a lens driving unit 194, a lens driving unit 196, a storage unit 260, and a vibration detection unit 270. The image capturing apparatus 100 is, for example, a mobile terminal such as a mobile phone, a smartphone, a tablet, a laptop computer, a small personal computer, and a wearable device.

The optical system 190 includes a zoom lens 191, a focus lens 193, and an image shake correcting lens 195. The focus lens 193 and the image shake correcting lens 195 may be formed of at least one lens. That is, at least one lens may provide both functions of a focus control and the image shake correcting. The image capturing apparatus 100 includes an Optical Image Stabilizer (OIS) and an In-Body Image Stabilizer (BIS). The image capturing apparatus 100 may include at least either of the Optical Image Stabilizer (OIS) and the In-Body Image Stabilizer (BIS). The OIS performs the image shake correcting by moving or rotating the image shake correcting lens 195. The BIS performs the image shake correcting by moving or rotating the image capturing element 180. If the image capturing apparatus 100 includes both the OIS and the BIS, the image shake correcting may be performed such that vibrations of different frequency bands are suppressed with each of the OIS and the BIS.

The image capturing element 180 may be formed of a CCD or CMOS. The image capturing element 180 outputs, to the control apparatus 170, a picture image data of an optical image that is imaged via the zoom lens 191, the focus lens 193, and the image shake correcting lens 195.

The control apparatus 170 may be formed of a microprocessor such as a CPU or an MPU, a microcontroller such as an MCU, or the like. The control apparatus 170 may be formed of a System-On-Chip (SoC). The storage unit 260 may be a computer readable storage medium, and it may include at least one of SRAM, DRAM, EPROM, EEPROM (registered trademark) or a flash memory such as a USB memory. The storage unit 260 stores therein a program or the like necessary for allowing the control apparatus 170 to control the image capturing element 180, the optical system 190, and the like. The storage unit 260 may be provided inside a housing of the image capturing apparatus 100. The storage unit 260 may be provided in a manner that is removable from the housing of the image capturing apparatus 100.

The zoom lens 191, the focus lens 193, and the image shake correcting lens 195 may include at least one lens. At least a part or all of the zoom lens 191 and the focus lens 193 are movably arranged along the optical axis.

The lens driving unit 192 moves the zoom lens 191 along the optical axis according to a zoom control instruction. The lens driving unit 194 moves the focus lens 193 along the optical axis according to a focus control instruction. The lens driving unit 196 moves the image shake correcting lens 195 in a plane (XY plane) intersecting with the optical axis according to an image shake correcting instruction. The lens driving unit 196 may rotate the image shake correcting lens 195 on axes (the X axis and the Y axis) along the plane intersecting with the optical axis according to the image shake correcting instruction. The lens driving unit 192, the lens driving unit 194, and the lens driving unit 196 may include the electromagnetic actuator, i.e., a voice coil motor, as the driving source. The lens driving unit 192, the lens driving unit 194, and the lens driving unit 196 may include a shape memory alloy (SMA) actuator or a piezo (piezoelectric) actuator as the driving source. The lens driving unit 192 and the lens driving unit 194 may include a stepping motor as the driving source.

The vibration detection unit 270 outputs a vibration signal indicating a vibration of the image capturing apparatus 100. The vibration detection unit 270 may include a gyrosensor which detects an angular velocity of the image capturing apparatus 100. The gyrosensor detects each of angular velocities having the axes along the X axis, the Y axis, and the Z axis as centers. The vibration detection unit 270 may include an acceleration sensor for detecting an acceleration of the image capturing apparatus 100. The vibration detection unit 270 may include an inertial measurement unit (IMU) for detecting angular velocities of the image capturing apparatus 100 having the axes along the X axis, the Y axis, and the Z axis as the centers, and an acceleration of the image capturing apparatus 100 in the X axis, Y axis, and Z axis directions of the image capturing apparatus 100.

The image capturing element driving unit 250 moves the image capturing element 180 in the plane intersecting with the optical axis according to the image shake correcting instruction. In addition, the image capturing element driving unit 250 rotates the image capturing element 180 on an axis along the optical axis according to the image shake correcting instruction. The image capturing element driving unit 250 may move and rotate the image capturing element 180 with three degrees of freedom. The image capturing element driving unit 250 may move the image capturing element 180 along the XY plane, and rotate the image capturing element 180 on the axis along the Z axis.

The control apparatus 170 controls the entire image capturing apparatus 100. The control apparatus 170 controls the lens driving unit 192, the lens driving unit 194, the lens driving unit 196, and the image capturing element driving unit 250.

Figure 17:
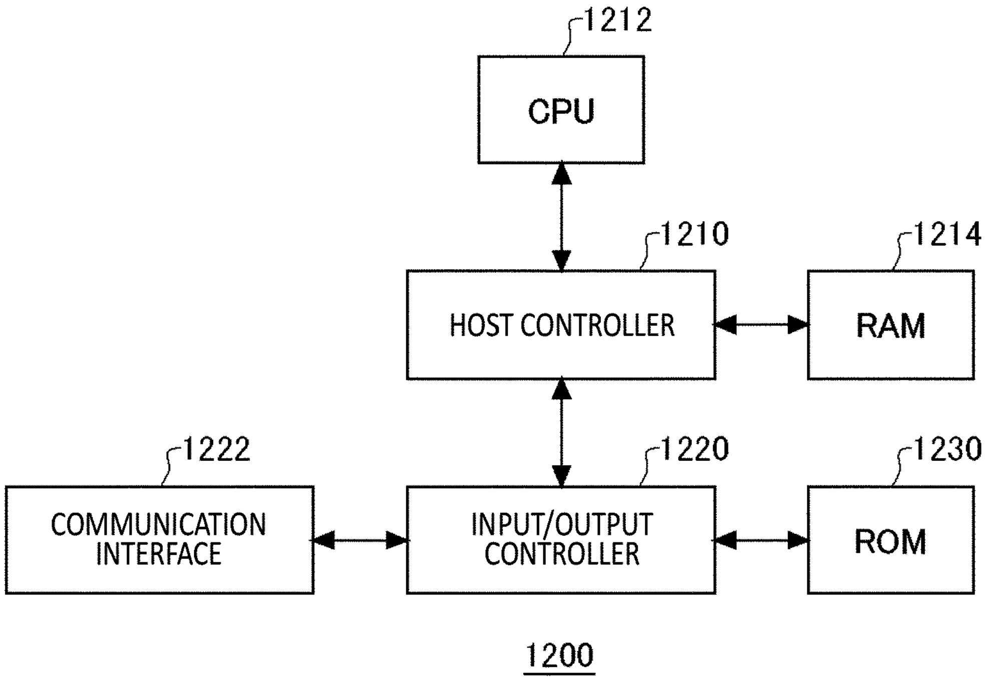
FIG. 17 shows an example of a hardware configuration.

FIG. 17 shows an example of a computer 1200 where a plurality of aspects of the present invention may be entirely or partially embodied. Programs installed in the computer 1200 can cause the computer 1200 to function as operations associated with the apparatus according to the embodiments of the present invention or one or more "units" of the apparatus. Alternatively, the programs can cause the computer 1200 to execute the operations or the one or more "units". The programs can cause the computer 1200 to execute a process according to the embodiments of the present invention or steps of the process. Such programs may be executed by a CPU 1212 to cause the computer 1200 to perform specific operations associated with some or all of the blocks in the flowcharts and block diagrams described in the present specification.

The computer 1200 according to the present embodiment includes the CPU 1212 and a RAM 1214, which are mutually connected by a host controller 1210. The computer 1200 also includes a communication interface 1222 and an input/output unit, which are connected to the host controller 1210 via an input/output controller 1220. The computer 1200 also includes an ROM 1230. The CPU 1212 operates according to the programs stored in the ROM 1230 and the RAM 1214, thereby controlling each unit.

The communication interface 1222 communicates with other electronic devices via a network. A hard disk drive may store the programs and data used by the CPU 1212 in the computer 1200. The ROM 1230 stores therein boot programs or the like executed by the computer 1200 at the time of activation, and/or programs depending on hardware of the computer 1200. The programs are provided via the computer readable storage medium such as CR-ROM, a USB memory or an IC Card or a network. The programs are installed on the RAM 1214, which is also an example of the computer readable storage medium, or the ROM 1230 and performed by the CPU 1212. Information processing written in these programs is read by the computer 1200, and provides coordination between the programs and the various types of hardware resources described above. The apparatus or method may be configured by implementing operations or processings of information according to the use of the computer 1200.

For example, in a case where a communication is performed between the computer 1200 and an external device, the CPU 1212 may execute a communication program loaded in the RAM 1214 and instruct the communication interface 1222 to perform communication processing based on a process written in the communication program. Under the control of the CPU 1212, the communication interface 1222 reads transmission data which is stored in the RAM 1214 or a transmission buffer region which is provided in a storage media such as a USB memory, to transmit the read transmission data to the network or write the reception data received from the network into a reception buffer region or the like provided on the storage media.

Also, the CPU 1212 may cause the whole or required part of files which are stored in the external storage media, such as USB memory, or the database to be read by the RAM 1214, to perform a various type of processes for the data on the RAM 1214. Then, the CPU 1212 may write back the processed data to the external storage media.

A various type of information such as a various type of programs, data, tables and databases may be stored in a storage media to undergo an information processing. The CPU 1212 may execute, on the data read from the RAM 1214, various types of processing including various types of operations, information processing, conditional judgement, conditional branching, unconditional branching, information retrieval/replacement, or the like described throughout the present disclosure and specified by instruction sequences of the programs, to write the results back to the RAM 1214. Also, the CPU 1212 may retrieve information in the file, database or the like in the storage media. For example, when a plurality of entries each having an attribute value of the first attribute associated with an attribute value of the second attribute are stored in a storage media, the CPU 1212 may retrieve, among the plurality of entries, an entry whose attribute value of the first attribute is specified and matches the conditions and read the attribute value of the second attribute stored in the entry, thereby acquiring the attribute value of the second attribute associated with the first attribute which satisfies a predefined condition.

The programs or software modules described above may be stored in a computer readable storage medium on the computer 1200 or near the computer 1200. Also, a storage media such as a hard disk or a RAM provided in a server system which is connected to a dedicated communication network or the Internet is allowed to be used as a computer readable storage medium, thereby a program is provided in a computer 1200 via the network.

Computer readable medium may include any tangible device that can store instructions for execution by a suitable device. As a result, the computer readable medium having instructions stored therein includes an article of manufacture including instructions which can be executed to create means for performing operations specified in the flowcharts or block diagrams. Examples of the computer readable medium may include an electronic storage medium, a magnetic storage medium, an optical storage medium, an electromagnetic storage medium, a semiconductor storage medium, or the like. More specific examples of the computer readable medium may include a floppy (registered trademark) disk, a diskette, a hard disk, a random access memory (RAM), a read-only memory (ROM), an erasable programmable read-only memory (EPROM or flash memory), an electrically erasable programmable read-only memory (EEPROM), a static random access memory (SRAM), a compact disc read-only memory (CD-ROM), a digital versatile disk (DVD), a Blu-ray (registered trademark) disk, a memory stick, an integrated circuit card, or the like.

Computer readable instructions may include either a source code or an object code written in any combination of one or more programming languages. The source code or the object code includes a conventional procedural programming language. The conventional procedural programming language may be assembler instructions, instruction-set-architecture (ISA) instructions, machine instructions, machine dependent instructions, microcode, firmware instructions, state-setting data, or an object-oriented programming language such as Smalltalk (registered trademark), JAVA (registered trademark), C++, etc., and programming languages, such as the "C" programming language or similar programming languages. Computer readable instructions may be provided to a processor of a general-purpose computer, special purpose computer, or other programmable data processing apparatus, or to programmable circuitry, locally or via a local area network (LAN), a wide area network (WAN) such as the Internet, etc. The processor or the programmable circuitry may execute the computer readable instructions to create means for performing operations specified in the flowcharts or block diagrams. An example of the processor includes a computer processor, processing unit, microprocessor, digital signal processor, controller, microcontroller, or the like.

While the present invention has been described above by way of the embodiments, the technical scope of the present invention is not limited to the scope in the above-described embodiments. It is apparent to persons skilled in the art that various alterations or improvements can be made to the above-described embodiments. It is also apparent from description of the claims that the forms to which such alterations or improvements are made can be included in the technical scope of the present invention.

Note that the order of execution of each process such as operations, procedures, steps, stages in the apparatus, system, program, and method shown in the claims, specification, and diagrams can be realized in any order as long as the order is not specifically indicated by "prior to," "before," or the like and also as long as the output from a previous process is not used in a later process. Even if the operational flow is described by using phrases such as "first" or "next" in the claims, specification, or diagrams for convenience, it does not necessarily mean that the process must be performed in this order.

EXPLANATION OF REFERENCES

100: image capturing apparatus
110, 210: movable member
115: position adjustment apparatus
120: air-core coil
140: integrated circuit
142: position sensor
144: control circuit
150: electromagnetic actuator
160: position
162: target position
170: control apparatus
172: position information acquisition unit
174: target posture information acquisition unit
175: correction information derivation unit
177: target position derivation unit
179: output unit
180: image capturing element
190: optical system
191: zoom lens
192, 194, 196: lens driving unit
193: focus lens
195: image shake correcting lens
200: substrate
220: magnet
230: arrow direction
250: image capturing element driving unit
260: storage unit
270: vibration detection unit
1200: computer
1210: host controller;

1212: CPU
1214: RAM
1220: input/output controller
1221: air-core portion
1222: communication interface
1230: ROM

What is claimed is:

1. A control method for controlling m+n (m and n are positive integers) control circuits each of which independently controls each of m+n driving sources moving or rotating a movable member with m degrees of freedom, the control method comprising:

acquiring respective position information indicating a position of the movable member from each of m+n position sensors which are provided at different positions relative to the movable member and detect a position of the movable member;

acquiring target posture information indicating a target posture of the movable member with m degrees of freedom components associated with a movement or a rotation of the movable member;

deriving correction information indicating a corrective component for correcting misalignments of m+n target positions of the movable member caused due to at least one of n degrees of freedom components other than m degrees of freedom associated with a movement or a rotation of the movable member, based on at least one value of m+n values corresponding to positions of the movable member indicated in the respective position information;

deriving m+n target positions of the movable member for the m+n control circuits, based on m degrees of freedom components indicated in the target posture information, the corrective component indicated in the correction information, and a set of coefficients predefined according to positions of the movable member to be applied to the corrective component; and outputting respective target position information indicating each of the target positions to each of the m+n control circuits to bring the movable member into a target posture.

2. The control method according to claim 1, wherein the m+n control circuits include s control circuits which control each of s driving sources moving or rotating the movable member in a specific drive range, and m+n−s control circuits which control each of m+n−s driving sources moving or rotating at least the movable member in other drive ranges outside the specific drive range, and deriving the target positions includes using a set of coefficients which would derive s target positions of the movable member for the s control circuits, without being based on m+n−s pieces of position information indicating positions of the movable member as detected by each of the position sensors utilized by the m+n−s control circuits to control the respective driving sources when the movable member is located within the specific drive range, as the set of coefficients predefined.

3. The control method according to claim 1, wherein the m+n control circuits include a first control circuit which controls a first driving source moving or rotating the movable member in a first drive range, and a second control circuit which controls a second driving source moving or rotating the movable member in a second drive range whose drive range overlaps in a first overlapping range which is part of the first drive range, the acquiring the respective position information includes acquiring first position information indicating positions of the movable member as detected by a first position sensor utilized by the first control circuit to control the first driving source, and second position information indicating positions of the movable member as detected by a second position sensor utilized by the second control circuit to control the second driving source, and the deriving the m+n target positions includes deriving a first target position for the first control circuit and a second target position for the second control circuit, based on the set of coefficients according to positions of the movable member which is based on the target posture, the corrective component, and at least one of the first position information or the second position information.

4. The control method according to claim 3, wherein the deriving the first target position and the second target position includes:

using a first set of coefficients with which the second target position would approach positions of the movable member detected by the second position sensor as the movable member approaches positions of the movable member which correspond to the target posture when the movable member is located outside the first overlapping range within the first drive range, as the set of coefficients, using a second set of coefficients with which the first target position would approach positions of the movable member detected by the first position sensor as the movable member approaches positions of the movable member which correspond to the target posture when the movable member is located outside the first overlapping range within the second drive range, as the set of coefficients, and using a set of coefficients of variation according to a predefined function which is based on the first position information and the second position information when the movable member is located within the first overlapping range, as the set of coefficients.

5. The control method according to claim 4, wherein the set of coefficients of variation is the same as the first set of coefficients when the movable member exists at a boundary position between a range outside the first overlapping range and the first overlapping range within the first drive range, and the set of coefficients of variation is the same as the second set of coefficients when the movable member exists at a boundary position between a range outside the first overlapping range and the first overlapping range within the second drive range.

6. The control method according to claim 3, wherein the m+n control circuits further include a third control circuit which controls a third driving source moving or rotating the movable member in a third drive range whose drive range overlaps in a second overlapping range which is part of the second drive range, the acquiring the respective position information includes acquiring third position information indicating positions of the movable member as detected by a third position sensor utilized by the third control circuit to control the third driving source, and the deriving the m+n target positions includes deriving the first target position for the first control circuit, the second target position for the second control circuit, and a third target position for the third control circuit, based on the set of coefficients according to positions of the movable member which is based on the target posture, the corrective component, and at least one of the first position information, the second position information, or the third position information.

7. The control method according to claim 6, wherein the deriving the first target position, the second target position, and the third target position includes:

using a first set of coefficients with which the second target position would approach positions of the movable member detected by the second position sensor and the third target position would approach positions of the movable member detected by the third position sensor as the movable member approaches positions of the movable member which correspond to the target posture when the movable member is located outside the first overlapping range within the first drive range, as the set of coefficients, using a second set of coefficients with which the first target position would approach positions of the movable member detected by the first position sensor and the third target position would approach positions of the movable member detected by the third position sensor as the movable member approaches positions of the movable member which correspond to the target posture when the movable member is located outside the first overlapping range within the second drive range and outside the second overlapping range, as the set of coefficients, using a third set of coefficients with which the first target position would approach positions of the movable member detected by the first position sensor and the second target position would approach positions of the movable member detected by the second position sensor as the movable member approaches positions of the movable member which correspond to the target posture when the movable member is located outside the second overlapping range within the third drive range, as the set of coefficients, and using a set of coefficients of variation according to a predefined function which is based on the first position information, the second position information, and the third position information when the movable member is located within the first overlapping range or within the second overlapping range, as the set of coefficients.

8. The control method according to claim 7, wherein the set of coefficients of variation is the same as the first set of coefficients when the movable member exists at a boundary position between a range outside the first overlapping range and the first overlapping range within the first drive range, the set of coefficients of variation is the same as the second set of coefficients when the movable member exists at a boundary position between a range outside the first overlapping range and the first overlapping range within the second drive range, or a boundary position between a range outside the second overlapping range and the second overlapping range within the second drive range, and the set of coefficients of variation is the same as the third set of coefficients when the movable member exists at a boundary position between a range outside the second overlapping range and the second overlapping range within the third drive range.

9. The control method according to claim 1, wherein the m+n control circuits include a first control circuit which controls a first driving source moving or rotating the movable member in a first drive range, a second control circuit which controls a second driving source moving or rotating the movable member in a second drive range, and a third control circuit which controls a third driving source moving or rotating the movable member in a third drive range, wherein the first drive range and the second drive range overlap in a first overlapping range, the first drive range, the second drive range, and the third drive range overlap in a second overlapping range, the second drive range and the third drive range overlap in a third overlapping range, and the first overlapping range, the second overlapping range, and the third overlapping range do not overlap one another, the acquiring the respective position information includes acquiring first position information indicating positions of the movable member as detected by a first position sensor utilized by the first control circuit to control the first driving source, second position information indicating positions of the movable member as detected by a second position sensor utilized by the second control circuit to control the second driving source, and third position information indicating positions of the movable member as detected by a third position sensor utilized by the third control circuit to control the third driving source, and the deriving the m+n target positions includes deriving a first target position for the first control circuit, a second target position for the second control circuit, and a third target position for the third control circuit, based on a set of coefficients according to positions of the movable member which is based on the target posture, the corrective component, and at least one of the first position information, the second position information, or the third position information.

10. The control method according to claim 9, wherein the deriving the first target position, the second target position and the third target position includes:

using a first set of coefficients with which the third target position would approach positions of the movable member detected by the third position sensor as the movable member approaches positions of the movable member which correspond to the target posture when the movable member is located within the first overlapping range, as the set of coefficients, using a second set of coefficients with which the first target position would approach positions of the movable member detected by the first position sensor as the movable member approaches positions of the movable member which correspond to the target posture when the movable member is located within the third overlapping range, as the set of coefficients, and using a set of coefficients of variation according to a predefined function which is based on the first position information, the second position information, and the third position information when the movable member is located within the second overlapping range, as the set of coefficients.

11. The control method according to claim 10, wherein the set of coefficients of variation is the same as the first set of coefficients when the movable member exists at a boundary position between the first overlapping range and the second overlapping range, and the set of coefficients of variation is the same as the second set of coefficients when the movable member exists at a boundary position between the second overlapping range and the third overlapping range.

12. The control method according to claim 1, wherein the corrective component includes a corrective component for each of n degrees of freedom components.

13. The control method according to claim 12, wherein the deriving the correction information includes deriving the correction information according to an algorithm defined by (m+n)×(m+n) matrix having m+n values corresponding to positions of the movable member indicated in the respective position information as variables.

14. The control method according to claim 1, wherein:

each of the m+n driving sources is an electromagnetic actuator;

each of the m+n position sensors is a magnetic sensor; and each of the m+n control circuits independently controls each of m+n electromagnetic actuators by a PID control based on the respective target positions.

15. The control method according to claim 1, wherein:

m is 1 and n is an integer of 1 or higher; and by driving of the m+n driving sources, the movable member moves along a first direction.

16. The control method according to claim 1, wherein:

m is 3 and n is an integer of 1 or higher; and by driving of the m+n driving sources, the movable member moves along a first direction and a second direction and rotates on a first rotational axis intersecting with a plane along the first direction and the second direction.

17. The control method according to claim 1, wherein:

m is 3 and n is an integer of 1 or higher; and by driving of the m+n driving sources, the movable member moves along a first direction and rotates on each of a first rotational axis and a second rotational axis along a plane intersecting with the first direction.

18. A control apparatus which controls m+n (m and n are positive integers) control circuits each of which independently controls each of m+n driving sources moving or rotating a movable member with m degrees of freedom, the control apparatus comprising at least one processor configured to:

acquire respective position information indicating a position of the movable member from each of m+n position sensors which are provided at different positions relative to the movable member and detect a position of the movable member;

acquire target posture information indicating a target posture of the movable member with m degrees of freedom components associated with a movement or a rotation of the movable member;

derive correction information indicating a corrective component for correcting misalignments of m+n target positions of the movable member caused due to at least one of n degrees of freedom components other than m degrees of freedom associated with a movement or a rotation of the movable member, based on at least one value of m+n values corresponding to positions of the movable member indicated in the respective position information;

derive m+n target positions of the movable member for the m+n control circuits, based on m degrees of freedom components indicated in the target posture information, the corrective component indicated in the correction information, and a set of coefficients predefined according to positions of the movable member to be applied to the corrective component; and output respective target position information indicating the respective target positions to each of the m+n control circuits to bring the movable member into a target posture.

19. An image capturing apparatus, comprising:

the control apparatus according to claim 18;

an image capturing element, an optical system for imaging an object on an image capturing plane of the image capturing element;

the m+n driving sources; and the m+n position sensors, wherein the movable member is the image capturing element or the optical system.

20. A non-transitory computer readable storage medium having stored thereon a program for causing a computer to function as a control apparatus which controls m+n (m and n are positive integers) control circuits each of which independently controls each of m+n driving sources moving or rotating a movable member with m degrees of freedom, the program causing the computer to perform:

acquiring respective position information indicating a position of the movable member from each of m+n position sensors which are provided at different positions relative to the movable member and detect a position of the movable member;

acquiring target posture information indicating a target posture of the movable member with m degrees of freedom components associated with a movement or a rotation of the movable member;

deriving correction information indicating a corrective component for correcting misalignments of m+n target positions of the movable member caused due to at least one of n degrees of freedom components other than m degrees of freedom associated with a movement or a rotation of the movable member, based on at least one value of m+n values corresponding to positions of the movable member indicated in the respective position information deriving m+n target positions of the movable member for the m+n control circuits, based on m degrees of freedom components indicated in the target posture information, the corrective component indicated in the correction information, and a set of coefficients predefined according to positions of the movable member to be applied to the corrective component; and outputting respective target position information indicating the respective target positions to each of the m+n control circuits to bring the movable member into a target posture.

* * * * *